(12) United States Patent
Kumar et al.

(10) Patent No.: US 12,437,133 B2
(45) Date of Patent: Oct. 7, 2025

(54) PROPERTY-DRIVEN AUTOMATIC GENERATION OF REDUCED COMPONENT HARDWARE

(71) Applicant: The Board of Trustees of the University of Illinois, Urbana, IL (US)

(72) Inventors: Rakesh Kumar, Urbana, IL (US); Nathaniel Lewis Bleier, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 619 days.

(21) Appl. No.: 17/695,387

(22) Filed: Mar. 15, 2022

(65) Prior Publication Data
US 2022/0302917 A1    Sep. 22, 2022

Related U.S. Application Data

(60) Provisional application No. 63/163,335, filed on Mar. 19, 2021.

(51) Int. Cl.
*G06F 30/30* (2020.01)
*G06F 9/30* (2018.01)
(Continued)

(52) U.S. Cl.
CPC .......... *G06F 30/327* (2020.01); *G06F 9/3016* (2013.01); *G06F 9/3836* (2013.01);
(Continued)

(58) Field of Classification Search
CPC .... G06F 30/327; G06F 9/3016; G06F 9/3836; G06F 30/3323; G06F 30/337; G06F 2119/16; H03K 19/096
See application file for complete search history.

(56) References Cited

U.S. PATENT DOCUMENTS

| | | | | |
|---|---|---|---|---|
| 4,960,724 A | * | 10/1990 | Watanabe | G06F 30/327 716/132 |
| 6,678,873 B1 | * | 1/2004 | Kohashi | G06F 30/30 716/102 |

(Continued)

OTHER PUBLICATIONS

OpenCores, "Overview:: openMSP430," Mar. 21, 2021, https://opencores.org/projects/openmsp430, printed from the World Wide Web Mar. 14, 2022.

(Continued)

*Primary Examiner* — Jack Chiang
*Assistant Examiner* — Brandon Bowers
(74) *Attorney, Agent, or Firm* — McDonnell Boehnen Hulbert & Berghoff LLP

(57) ABSTRACT

An embodiment may involve obtaining a specification of connectivity between a plurality of electronic components, a property library of logical validations, and a set of restrictions for an execution environment of the electronic components, wherein each of the electronic components is associated with at least one of the logical validations; determining that, according to properties in the property library applied to their associated electronic components, a subset of the electronic components exhibit invariance within the execution environment; based on the subset of the electronic components that exhibit invariance within the execution environment, rewiring the connectivity between the plurality of electronic components; and performing logic synthesis on the connectivity between the plurality of electronic components as rewired to simplify at least some of the subset of the electronic components that exhibit invariance within the execution environment.

20 Claims, 20 Drawing Sheets

(51) Int. Cl.
    *G06F 9/38*     (2018.01)
    *G06F 30/327*     (2020.01)
    *G06F 30/3323*     (2020.01)
    *G06F 30/337*     (2020.01)
    *G06F 119/16*     (2020.01)
    *H03K 19/096*     (2006.01)

(52) U.S. Cl.
    CPC ........ *G06F 30/3323* (2020.01); *G06F 30/337* (2020.01); *G06F 2119/16* (2020.01); *H03K 19/096* (2013.01)

(56) References Cited

U.S. PATENT DOCUMENTS

| | | | |
|---|---|---|---|
| 7,454,323 B1* | 11/2008 | Bain | G06F 30/33 713/193 |
| 7,757,224 B2 | 7/2010 | Forin et al. | |
| 9,235,669 B2 | 1/2016 | Prikryl et al. | |
| 10,671,774 B2 | 6/2020 | Cherupalli et al. | |
| 10,866,630 B2 | 12/2020 | Cherupalli et al. | |
| 11,210,402 B2 | 12/2021 | Cherupalli et al. | |
| 11,210,439 B2 | 12/2021 | Cherupalli et al. | |
| 2007/0299648 A1* | 12/2007 | Levitt | G06F 30/3323 703/22 |
| 2019/0220553 A1* | 7/2019 | Renau | G06F 30/343 |
| 2021/0041938 A1 | 2/2021 | Cherupalli et al. | |

OTHER PUBLICATIONS

Pan Yu, et al., "Scalable Custom Instructions Identification for Instruction-Set Extensible Processors," In Proceedings of the 2004 International Conference on Compilers, Architecture, and Synthesis for Embedded Systems, pp. 69-78, CASES'04, Sep. 2004.

Pan Yu, et al., "Characterizing Embedded Applications for Instruction-Set Extensible Processors," In Proceedings of the 41st Annual Design Automation Conference, pp. 723-728, DAC 2004, Jun. 2004.

Dr. Dipesh Patel, "ARM Physical IP Overview," ARM® 2012 IEEE, In 2012 IEEE International SOI Conference (SOI), pp. 1-16, downloaded on Mar. 15, 2022 from IEEE Xplore.

David Patterson, et al., "The Case for the Reduced Instruction Set Computer," ACM SIGARCH Computer Architecture News, 8(6):25-33, 1980.

Dick Price, "Pentium FDIV flaw—lessons learned," IEEE Micro, 1995 IEEE, downloaded on Mar. 15, 2022 from IEEE Xplore.

Vahid Rafe, et al., "A Survey on Coping with the State Space Explosion Problem in Model Checking," International ResearchJournal of Applied and Basic Sciences, vol. 4 (6): 1379-1384, 2013.

Ryan Roemer, et al., "Return-Oriented Programming: Systems, Languages, and Applications, " ACM Transactions on Information and System Security, vol. 15, No. 1, Article 2, Mar. 2012.

Douglas Almeida dos Santos, et al., "A Low-Cost Fault-Tolerant RISC-V Processor for Space Systems," 2020 15th Design & Technology of Integrated Systems in Nanoscale Era (DTIUS), pp. 1-5, IEEE 2020.

Sergio Saponara, et al., "Application-Specific Instruction-Set Processor for Retinex-Like Image and Video Processing," IEEE Transactions on Circuits and Systems-II: Express Briefs, vol. 54, No. 7, Jul. 2007.

Bowen Alpern, et al., "Recognizing safety and liveness*," Distributed Computing (1987) 2:117-126.

Steve Leibson. Designing SOCs with Configured Cores: Unleashing the Tensilica Xtensa and Diamond Cores. Elsevier, 2006.

Yakun Sophia Shao, et al., "ISA-Independent Workload Characterization and its Implications for Specialized Architectures," In 2013 IEEE International Symposium on Performance Analysis of Systems and Software (ISPASS), pp. 245-255, 2013 IEEE, downloaded on Mar. 15, 2022 from IEEE Xplore.

Jeckson Dellagostin Souza, et al., "Trimming the ISA to Optimize Area and EDP Heterogeneous CMPs," 2019 31st International Symposium on Computer Architecture and High Performance Computing (SBAC-PAD), 2019 IEEE, downloaded on Mar. 15, 2022 from IEEE Xplore.

Masashi Fujinami, et al., "RIDECORE: Risc-v Dynamic Exection CORE," Mar. 28, 2016.

"The LLVM Compiler Infrastructure, LLVM Overview," The LLVM Compiler Infrastructure Project, https://llvm.org, printed from the World Wide Web on Mar. 15, 2022.

Tong Li, et al., "Operating System Support for Overlapping-ISA Heterogeneous Multi-core Architectures, " 2009 IEEE, downloaded on Mar. 15, 2022 from IEEE Xplore.

Antti Valmari, "The State Explosion Problem," In Advanced Course on Petri Nets, pp. 429-528. Springer, 1996.

Ashish Venkat, et al., "Harnessing ISA Diversity: Design of a Heterogeneous-ISA Chip Multiprocessor," ACMIEEE 41st International Symposium on Computer Architecture (ISCA) 2014 IEEE, downloaded on Mar. 15, 2022 from IEEE Xplore.

Andrew Waterman, et al., "The RISC-V Instruction Set Manual, vol. I: Base User-Level ISA," http://www.eecs.berkeley.edu/Pubs/TechRpts/2011/EECS-2011-62.html, May 13, 2011.

Christophe Wolinski, et al., "Automatic Selection of Application-Specific Reconfigurable Processor Extensions, " 2008 EDAA.

Wooseok Lee, et al., "Exploring Heterogeneous-ISA Core Architectures for High-Performance and Energy-Efficient Mobile SoCs," GLSVLSI '17, May 2017.

Bo Zhai, et al., "Energy-Efficient Subthreshold Processor Design," IEEE Transactions on Very Large Scale Integration (VLSI) Systems, vol. 17, No. 8, Aug. 2009, downloaded on Mar. 15, 2022 from IEEE Xplore.

Zheng Cui, et al., "Printed Electronics—Materials, Technologies and Applications," Wiley, Higher Education Press, 2016.

ARC International, "Products & Solutions—ARChitect™ Processor Configurator—Powerfule Design Tool Automates Configurability and Extendibility of ARC Cores," https?//web.archive.org/web/20090422141606/http://www.arc.com/configurablecores/architect/, 2009 ARC International, printed from the World Wide Web Mar. 30, 2022.

Christel Baier, et al., "Principles of Model Checking," MIT Press, 2008.

David Albonesi, "The Inherent Energy Efficiency of Complexity-Adaptive Processors," In Proc. 1998 Power-Driven Microarchitecture Workshop, pp. 107-112, 1998.

Andrei Lutas, et al., "Bitdefender—Bypassing KPTI Using the Speculative Behavior of the SWAPGS Instruction," White Paper, 2019.

"Cortex -M0, Revision: r0p0, Technical Reference Manual," ARM Limited, ARM DDI 0432C, 2009.

Lauranne Choquin, et al., "Arm Custom Instructions: Enabling Innovation and Greater Flexibility on Arm," Arm, Feb. 2020.

"ARM Processor Cortex ™-M0+, Product Revision r0, Software Developers Errata Notice," ARM, ARM-EPM-018879 v4.0, 2012.

"Arm Processor Cortex™-M4 (AT520) and Cortex-M4 with FPU (AT521), Product Revision r0, Software Developers Errata Notice," Arm, ARM-ECM-0426805 v3, 2019.

Jonathan Bachrach, et al., "Chisel: Constructing Hardware in a Scala Embedded Language," DAC (Design Automation Conference) 2012, pp. 1212-1221, downloaded Mar. 14, 2022 from IEEE Xplore.

Iain Bate, et al., "Use of Modern Processors in Safety-Critical Applications," The Computer Journal, vol. 44, No. 6, pp. 531-543, Apr. 2001.

Nathaniel Bleier, et al., "Printed Microprocessors," 2020 ACE/IEEE 47th Annual International Symposium on Computer Architecture (ISCA), pp. 213-226, IEEE 2006, downloaded on Mar. 14, 2022 from IEEE Xplore.

Edson Borin, et al., "Clustering-Based Microcode Compression," 2006 International Conference on Computer Design, pp. 189-196, 2006 IEEE, downloaded on Mar. 14, 2022 from IEEE Xplore.

Prof. Bruce Jacob, "The RiSC-16 Instruction-Set Architecture," ENEE 646: Digital Computer Design, Fall 2002.

(56) References Cited

OTHER PUBLICATIONS

Erik Buchanan, et al., "When Good Instructions Go Bad: Generalizing Return-Oriented Programming to RISC," In Proceedings of the 15th ACM Conference on Computer and Communications Security, CCS'08, Oct. 2008.
J. R. Burch, et al., "Sequential Circuit Verification Using Symbolic Model Checking," 27th ACM/IEEE Design Automation Conference, 1990 IEEE, downloaded on Mar. 14, 2022 from IEEE Xplore.
Stephen Checkoway, et al., "Return-Oriented Programming without Returns," In Proceedings of the 17th ACM Conference on Computer and Communications Security, CCS'10, Oct. 2010.
Hari Cherupalli, et al., "Bespoke Processors for Applications with Ultra-low Area and Power Constraints," In Proceedings of ISCA '17, Jun. 2017.
Edmund Clarke, et al., "Hardware Verification using ANSI-C Programs as a Reference," In Proceedings of the ASP-DAC Asia and South Pacific Design Automation Conference, 2003, pp. 308-311, 2003 IEEE.
Christopher Domas, "Breaking the x86 ISA," Black Hat, Jul. 27, 2017.
Rolf Drechsler, "Synthesizing Checkers for On-Line Verification of System-On-Chip Designs," In Proceedings of the 2003 International Symposium on Circuits and Systems, 2003, ISCAS'03, vol. 4, 2003 IEEE, downloaded on Mar. 24, 2022 from IEEE Xplore.
Lieven Eeckhout, "Is Moore's Law Slowing Down? What's Next?," From the Editor in Chief, IEEE Computer Society, www.computer.org/micro, Jul./Aug. 2017 IEEE.
Hadi Esmaeilzadeh, et al., "Dark Silicon and the End of Multicore Scaling," IEEE Computer Society, IEEE Micro, May/Jun. 2012.
Paul Gastin, et al., "Fast LTL to Buchi Automata Translation," In International Conference on Computer Aided Verification, CAV 2001, LNCS 2102, pp. 53-65, 2001.
Rich Goldman, et al., "IC Design Course Based on the Synopsys DesignWare ARC 600 Processor Core and 32/28nm Educational Design Kit," In Fourth Interdisciplinary Engineering Design Education conference, IEDEC, 2013 IEEE, downloaded on Mar. 2022 from IEEE Xplore.
Ricardo Gonzalez, "Xtensa: A Configurable and Extensible Processor," IEEE Micro, Mar.-Apr. 2000, downloaded on Mar. 14, 2022 from IEEE Xplore.
Daniel Grobe, et al., "HW/SW Co-Verification of Embedded Systems using Bounded Model Checking," In Proceedings of the 16th ACM Great Lakes symposium on VLSI, pp. 43-48, GLSVLSI'06, 2006.
Matthew Guthaus, et al., "MiBench: A Free, commercially representative embedded benchmark suite," In Proceedings of the fourth annual IEEE international workshop on workload characterization, pp. 3-14, 2001 IEEE, downloaded on Mar. 14, 2022 from IEEE Xplore.
Simon Hammond, et al., "Evaluating the Intel Skylake Xeon Processor for HPC Workloads," 2018 International Conference on High Performance Computing & Simulation, 2018 IEEE, downloaded on Mar. 14, 2022 from IEEE Xplore.
Klaus Havelund, et al., "Synthesizing Monitors for Safety Properties," In International Conference on Tools and Algorithms for the Construction and Analysis of Systems, TACAS 2002, LNCS 2280, pp. 342-356, 2002.
Jiongrui He, et al., "High-performance RISC-V processor with improved dispatch and commit schemes," In 2020 International Conference on Electronics, Information, and Communication (ICEIC), pp. 1-4. IEEE, 2020, downloaded on Mar. 15, 2022 from IEEE Xplore.
Matthew Hicks, et al., "SPECS: A Lightweight Runtime Mechanism for Protecting Software from Security-Critical Processor Bugs," In Proceedings of the Twentieth International Conference on Architectural Support for Programming Languages and Operating Systems, pp. 517-529, ASPLOS '15, Mar. 2015.
Mark Hill, et al., "On the Spectre and Meltdown Processor Security Vulnerabilities," Theme Article, IEEE Computer Society, Mar./Apr. 2019, downloaded on Mar. 15, 2022 from IEEE Xplore.
Evgeniy Ilyushin, et al., "On source-to-source compilers," International Journal of Open Information Technologies International Journal of Open Information Technologies, 4(5), 2016.
Intel, "Desktop 3rd Generation Intel® Core ™ Processor Family, Specification Update," Revision 022, Apr. 2016.
Intel, "Desktop 4th Generation Intel® Core™ Processor Family, Desktop Intel® Pentium® Processor Family, and Desktop Intel® Celeron® Processor Family, Specification Update," Revision 039US, Apr. 2020.
Intel, 8th and 9th Generation Intel® Core™ Processor Family, Specification Update,' Revision 002, Nov. 2019.
"Intel® FPGA IP Portfolio," FPGA IP (Intellectual Property) Cores—Intel® FPGA, 2020, https://www.intel.com/content/www.us.en/products/programmable/intellectual-property.html, printed from World Wide Web Mar. 15, 2022.
Kenta Ishiguro, et al., "Hardening Hypervisors against Vulnerabilities in Instruction," In Proceedings of the 11th European Workshop on Systems Security, pp. 1-6, EuroSec'18, Apr. 2018.
Manoj Kumar Jain, et al., "ASIP Design Methodologies : Survey and Issues," In VLSI Design 2001, Fourteenth International Conference on VLSI Design, pp. 76-81, 2001 IEEE, downloaded on Mar. 15, 2022 from IEEE Xplore.
Paul Kocher, et al., "Spectre Attacks: Exploiting Speculative Execution," 2019 IEEE Symposium on Security and Privacy, 2019 IEEE, downloaded on Mar. 15, 2022 from IEEE Xplore.
Leslie Lamport, "What Good is Temporal Logic?," Invited Paper, Information Processing 83, R.E.A. Mason (ed.), pp. 657-668, 1983.
F. J. Lin, et al., "Protocol Verification Using Reachability Analysis: The State Space Explosion Problem and Relief Strategies'," In Proceedings of the ACM Workshop on Frontiers in Computer Communications technology, 1988.
Bruno Cardoso Lopes, et al., "SHRINK: Reducing the ISA Complexity Via Instruction Recycling," ISA '15, Jun. 2015.
Bruno Lopes, et al., "ISA Aging: An X86 case study," ResearchGate, Conference Paper, Jul. 2013.
"Ibex Documentation, Release 0.1.dev50+gf44ae90.d20220321, lowRIsC," Ibex user Manual, Mar. 21, 2022.
Grant Martin, "Recent Developments in Configurable and Extensible Processors," Architectures and Processors (ASAP'06), 2006 IEEE, downloaded on Mar. 15, 2022 from IEEE Xplore.
K.L. McMillan, "A methodology for hardware verification using compositional model checking," Science of Computer Programming 37, pp. 279-309, 2000.
"Questa Formal Verification Apps—Exhaustive Solutions for Verification Challenges," https://eda.sw.siemens.com/en-US/ic/questa/formal-verification/, 2020, printed from the World Wide Web Mar. 15, 2022.
Atsushi Mizuno, et al., "Design Methodology and System for a Configurable Media Embedded Processor Extensible to VLIW Architecture," Proceedings of the 2002 IEEE International Conference on Computer Design: VLSI in Computers and Processors (ICCD'02), 2002 IEEE, downloaded on Mar. 15, 2022 from IEEE Xplore.
Kris Myny, et al., "An 8-Bit, 40-Instructions-Per-Second Organic Microprocessor on Plastic Foil," IEEE Journal of Solid-State Circuits, 2011 IEEE, Dec. 2011, downloaded on Mar. 15, 2022 from IEEE Xplore.
Hamid Noori, et al., "General Overview of an Adaptive Dynamic Extensible Processor," In Workshop on Introspective Architectues, 2006.

* cited by examiner

TABLE I

NUMBER OF INSTRUCTIONS USED BY DIFFERENT MiBENCH BENCHMARK GROUPS FOR IBEX AND CORTEX M0 CORES.

| Ibex | | MiBench Benchmarks | | | |
|---|---|---|---|---|---|
| ISA Extension | Supported | Networking | Security | Automotive | Total |
| RV32i base | 40 | 18 | 24 | 28 | 29 |
| M-Extension | 8 | 2 | 0 | 3 | 4 |
| C-Extension | 23 | 13 | 18 | 19 | 20 |
| Zicsr-Extension | 7 | 0 | 0 | 0 | 0 |
| Total | 78 | 33 | 42 | 50 | 53 |
| Cortex M0 | | MiBench Benchmarks | | | |
| ISA | Supported | Networking | Security | Automotive | Total |
| ARMv6-M | 83 | 55 | 40 | 48 | 50 |

FIG. 2

Listing 1
AN EXAMPLE PROPERTY MODULE FROM OUR PROPERTY LIBRARY FOR A TWO-INPUT AND GATE.

```
module and2_properties(input A1, A2, ZN);
    default clocking @($global_clock);
    endclocking default disable iff(1'b0);
    and_out_ZN_0: assert property (ZN == 1'b0);
    and_out_ZN_1: assert property (ZN == 1'b1);

and_in_A2_A: assert property(A1 -> A2);
    and_in_A1_A2: assert property(A2 -> A1);
endmodule
```

FIG. 4

Listing 2
PACKAGE OF SVA PROPERTIES FOR ANALYSIS OF A MICROPROCESSOR CORE
IMPLEMENTING THE RV32I ISA. WE USE PROPERTIES TO ENCODE
SINGLE INSTRUCTIONS (LINES 2 TO 11) AND TO ENCODE GROUPS OF
INSTRUCTIONS (LINES 13 TO 24).

```
1   package rv32i_pkg;
2   property $lui(logic[31:0]instr);
3       instr[6:0] == op_lui;
4   endproperty
5   property $auipc(logic[31:0]instr);
6       instr[6:0] == op_auipc;
7   endproperty
8   //...
9   property $ebreak(logic[31:0]instr);
10      instr == 32'h00100073;
11  endproperty 13  property rv32i_all(logic[31:0]instr);
14      $lui(instr) or
15      $auipc(instr) or
16      //...
17      $ebreak(instr);
18  endproperty
19  property unwanted(logic[31:0]instr);
20      $jalr(instr) or
21      $fence(instr) or
22      $ecall(instr) or
23      $ebreak(instr);
24  endproperty
25  endpackage
```

FIG. 6

Listing 3
THIS MODULE ALLOWS THE PROPERTY CHECKER TO DRIVE THE CORE WITH ANY PROGRAM COMPOSED OF THE DESIRED SUBSET OF THE RV32i ISA (I.E., ANY RV32I INSTRUCTION THAT IS NOT 'UNWANTED').

```
1  module rv32i_pmem #(parameter instr_count)(
2      input [31:0] pc,
3      output logic [31:0] instr
4  );
5  logic [31:0] pmem [instr_count];
6  for(genvar i = 0; i < instr_count; ++i) begin
7      as_instr_subset: assume property(
8          @(clk) disable iff(1'b0)
9          rv32i_pkg::rv32i_all(pmem[i]) and
10         not rv32i_pkg::unwanted(pmem[i]));
11     as_const: assume property(
12         @(clk) disable iff(1'b0)
13         nexttime $stable(pmem[i])
14     );
15 end
16 assign instr = pmem[pc[31:2] % instr_count];
17 endmodule
```

FIG. 7

Listing 4
FORMAL TESTBENCH FOR RV32I

```
1  module rv32itb #(parameter pmem_size)
2    (
3    /* rv32itb ports */
4    );
5    logic [31:0] pc, instr;
6    rv32ipmem #(pmem_size) pmem (.*);
7    rv32icore_netlist cua (.*);
8    /* Example Checker module bindings */
9    bind AND2 and2_properties and2p (.*);
10   bind NOT not_properties notp (.*);
11   /* etc */
12   /* Other logic / assumptions */
13 endmodule
```

TABLE II
ARCHITECTURE AND MICROARCHITECTURE FEATURES OF IBEX,
RIDECORE, AND CORTEX M0.

| Core | ISA | Stages | IW | ROB Size | BP | BTB Entries | Physical Registers | Gate Count |
|---|---|---|---|---|---|---|---|---|
| Ibex | RV32imc | 2(3) | 2(3) | 64 | SNT | N/A | 32 | 10k |
| RIDECORE | RV32im | 6 | 1 | N/A | G-Share | 8 | 96 | 100k |
| Cortex M0 | ARMv6-m | 3 | 1 | N/A | SNT | N/A | 16 | 10k |

FIG. 11

TABLE III
THE NUMBER OF GATES NEEDED TO IMPLEMENT 'MICRO' ISA SUBSET
VARIANTS OF IBEX.

| ISA Subset | Gates (count) | Gates (%) |
|---|---|---|
| Full Ibex | 22026 | 100% |
| ADD | 647 | 2.9% |
| SW | 1345 | 5.9% |
| CGI | 9456 | 42.9% |
| ADDI | 10608 | 48.2% |
| ADDI + ADD | 10715 | 48.7% |
| ADDI + SW | 11562 | 52.5% |

FIG. 17

PROPERTY-DRIVEN AUTOMATIC GENERATION OF REDUCED COMPONENT HARDWARE

CROSS-REFERENCE TO RELATED APPLICATION

This application claims priority to U.S. provisional patent application No. 63/163,335, filed Mar. 19, 2021, which is hereby incorporated by reference in its entirety.

BACKGROUND

The ever-increasing diversity in the needs of different software applications that use the same microprocessor or accelerator design has researchers and vendors looking for low-cost approaches to customize hardware designs for different needs. The ability to customize computing hardware at low cost improves computing efficiency for the end customers by reducing unnecessary delay, area, and power costs. Low-cost customizability also makes it easier to react to any performance or correctness defects or security vulnerabilities discovered since the design was finalized.

Prior work in this area is limited in the sense that it is focused on adding instructions to an instruction set, tied to a particular hardware design, and/or primarily based on parameterization and metaprogramming. It is desirable to be able to relax one or more of these constraints.

SUMMARY

The embodiments herein provide automatic customization of given hardware, available as a soft or firm IP, through eliminating unneeded or undesired components, such as instruction set architecture (ISA) instructions. A property-based framework for automatically generating reduced component hardware is presented. This framework directly operates on an arbitrary resistor—transistor logic (RTL) or gate-level netlist, uses property checking to identify gates that are guaranteed to not toggle if only reduced components to be supported, and automatically eliminates these untogglable gates to generate a new design.

These designs can be more efficient in terms of gate count and possibly other parameters as well. As an example, a 14% gate count reduction is shown when the Ibex core is optimized using this framework for the instructions required by a set of MiBench workloads. Reduced-ISA versions generated by the framework that support a limited set of ISA extensions provide 10%-47% gate count reduction. For an obfuscated Cortex M0 netlist, a 20% area reduction and 18% gate count reduction is observed compared to the baseline core for supporting the instructions in the MiBench benchmarks. When applying the framework to a 100,000-gate RIDECORE design, a 14%-17% gate count reduction is observed. The generality of the framework is demonstrated by generating bespoke Ibex and RIDECORE processors customized for a set of MiBench and sensor benchmarks, showing 41%-84% and 5%-9% gate count reduction, respectively.

Accordingly, a first example embodiment may involve obtaining a specification of connectivity between a plurality of electronic components, a property library of logical validations, and a set of restrictions for an execution environment of the electronic components, wherein each of the electronic components is associated with at least one of the logical validations. The first example embodiment may further involve determining that, according to properties in the property library applied to their associated electronic components, a subset of the electronic components exhibit invariance within the execution environment. The first example embodiment may further involve, possibly based on the subset of the electronic components that exhibit invariance within the execution environment, rewiring the connectivity between the plurality of electronic components. The first example embodiment may further involve performing logic synthesis on the connectivity between the plurality of electronic components as rewired to simplify at least some of the subset of the electronic components that exhibit invariance within the execution environment.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

A fifth example embodiment may involve obtaining a specification of connectivity between a plurality of electronic components, a property library of logical validations, and a set of restrictions for an execution environment of the electronic components, wherein each of the electronic components is associated with at least one of the logical validations. The fifth example embodiment may also involve determining that, according to properties in the property library applied to their associated electronic components, a subset of the electronic components exhibit invariance within the execution environment. The fifth example embodiment may also involve, possibly based on the subset of the electronic components that exhibit invariance within the execution environment, rewiring the connectivity between the plurality of electronic components. The fifth example embodiment may also involve performing logic synthesis on the connectivity between the plurality of electronic components as rewired to simplify at least some of the subset of the electronic components that exhibit invariance within the execution environment. The fifth example embodiment may also involve fabricating a chip containing the plurality of electronic components as rewired.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 2 depicts numbers of instructions used by various benchmarks, in accordance with example embodiments.

FIG. 4 depicts an example property module, in accordance with example embodiments.

FIG. 6 depicts a package of properties, in accordance with example embodiments.

FIG. 7 is a code module, in accordance with example embodiments.

FIG. 8 is a formal testbench listing, in accordance with example embodiments.

FIG. 9 depicts a RISC-V code fragment, in accordance with example embodiments.

FIG. 11 depicts features of three cores were used for evaluations, in accordance with example embodiments.

FIG. 17 depicts numbers of gates used to implement subsets of instruction set architectures, in accordance with example embodiments.

DETAILED DESCRIPTION

Figure 1:
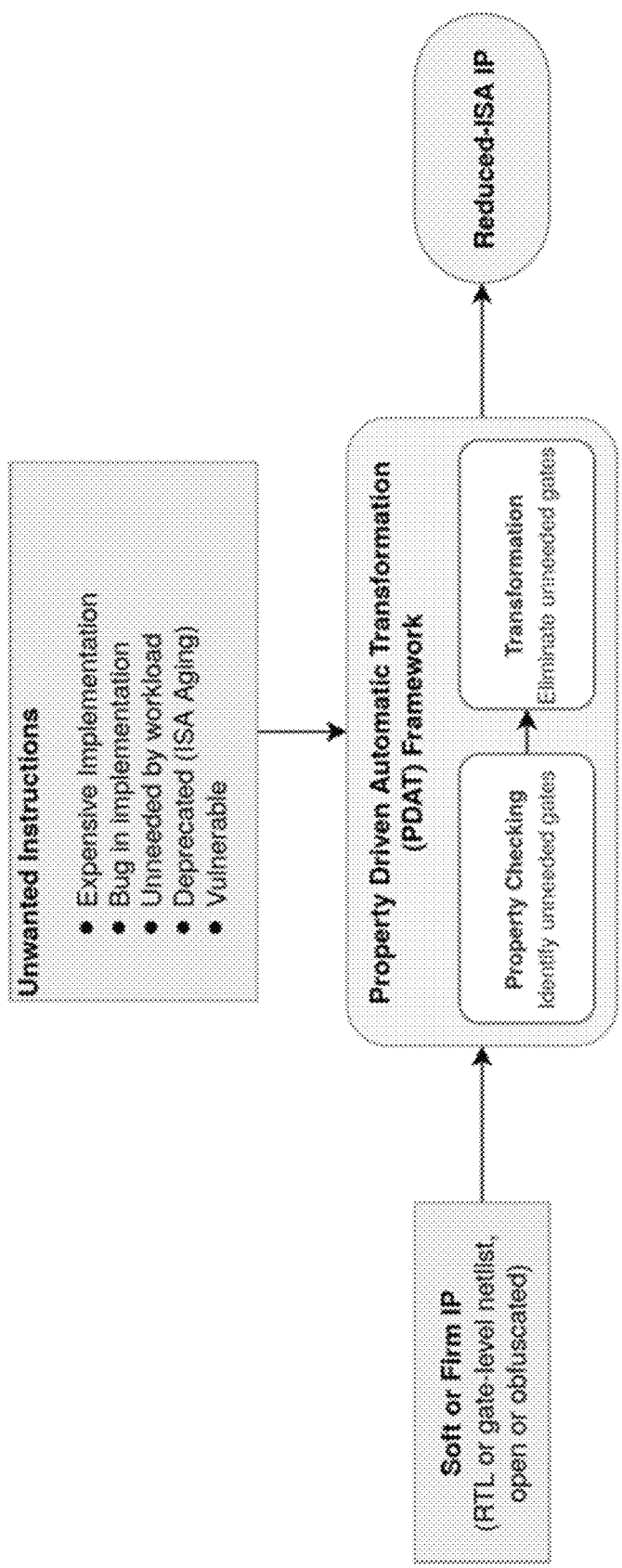
FIG. 1 depicts a property-driven framework, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Use of the term "optimize" herein should not be interpreted to require an optimal solution, especially when it is not tractable to find such a solution. Instead, "optimize" refers to the act of or ability to improve a system, module, component, or process.

Use of the term "IP" herein refers to the semiconductor context, in which it is a reusable unit of logic or functionality, or a cell or a layout design that can be licensed as building blocks in different chip designs. System-on-a-chip (SOC) designs can be built around one or more of these IP cores/blocks (e.g., a microprocessor, buses, communication interfaces, memory, and controllers).

Use of the term "netlist" herein refers to a description of the connectivity of an electronic circuit. For example, a netlist may consist of a list of the electronic components in a circuit and list of the electronic components to which they are connected. The structure of netlists can vary, as some may be flat and others may be hierarchical. The description within a netlist may refer to physical or logical components.

I. INTRODUCTION

The embodiments herein focus on automatic customization of a given hardware design (RTL or gate-level netlist, obfuscated or open)—available as a soft or firm IP—through instruction set architecture (ISA) trimming or other techniques. Eliminating support for unneeded or undesired instructions from a microprocessor design can generate significant efficiency benefits. An instruction may be unneeded due to the nature of a design's target workloads, ISA aging, etc. Similarly, an instruction may be undesired due to high implementation cost, a security vulnerability it may cause, or a defect in its implementation. The ability to automatically customize a processor core for a specified ISA subset can also aid generation of multi-ISA heterogeneous multicore designs where ISAs of the different cores correspond to different subsets of the same composite or base ISA.

The embodiments herein introduce a property-driven framework for automatically generating hardware for a specified reduced ISA from the base RTL or gate-level netlist (which is how soft and firm IPs are usually available). As depicted in FIG. 1, the property-driven framework automatically trims a given soft or firm IP by eliminating hardware overhead for unneeded or undesired instructions. This framework allows specification of a rich set of constraints to the base design, expressed as temporal logic formulas. A property is attached to every gate (or RTL module) that is checked under constraint(s). An action—e.g., removal of gates from the base design—is taken if a property is proved to hold. In the specific context explored here, the ISA subset that does not need to be supported is expressed as a constraint to the base design's execution environment.

For every gate, property checking is used to check for gate invariants, such as whether or not a gate's output is constant when the specified ISA subset is not supported. If it is proved that a gate's output is constant, the net attached to the gate's output is detached from the gate and assigned to its constant value. The design is then re-synthesized, eliminating the unneeded gate (and potentially many more). The approach is largely black box (i.e., requires limited knowledge or understanding of the microarchitecture implemented by the RTL or the gate-level netlist), compatible with any synthesis flow, applicable to arbitrary processor and accelerator designs (indeed to an arbitrary synchronous circuit), and can eliminate arbitrary instructions in the ISA (e.g., including base-ISA instructions). The resulting new hardware designs are generated without requiring any manual changes to the RTL or the gate-level netlist. Indeed, this approach applies to obfuscated cores (where the structure of hardware is designed to intentionally conceal its functionality, making it more difficult to reverse engineer), although obfuscation may impact the area and gate-count reduction achieved.

The framework can be used not only for generating microprocessor and accelerator hardware for a specified reduced ISA; it can also be used to explore and compare the cost (e.g., area, delay, etc.) of implementing an arbitrary ISA subset, estimate and compare the marginal benefit (cost) of removing (retaining) an arbitrary instruction, determine—in conjunction with other tools (e.g., performance simulators)—the optimal ISA subset for a given metric (energy, performance, etc.) while meeting cost constraints (e.g., an area budget), and understand the impact of microarchitecture on the cost of implementing, eliminating, and retaining instructions. Also, while the primary focus herein is ISA-based customization, extensions of the framework can be used to restrict microprocessor features, allowable instruction sequences, programs, and data types, and generate a multi-ISA heterogeneous multi-core architecture. As one example, this framework can be extended to generate a bespoke processor, i.e., a processor customized for a specific application.

Further, this framework provides benefits to both IP vendors and IP integrators for both analysis and optimization. The framework is particularly useful in context of emerging open ISAs such as RISC-V, since cores can be generated for reduced ISAs without any restrictions or licensing issues. The value of the framework may increase with the increasing trend towards allowing ISA customization (e.g., Arm Custom Instructions), recent challenges with technology scaling (and, therefore, the need for efficiency wins to come from elsewhere), and seemingly increasing instruction-based correctness and security issues. The framework may also be particularly useful for area-constrained FPGA-based systems and gate count-constrained low-cost manufacturing technologies, such as printed electronics and microprocessors since custom designs with low area and gate counts produced by the framework can be fabricated cheaply or on-demand. Compiler backends can be modified for generating reduced ISA code and transcompilation (cross-compiling) tools may be needed for code retargeting.

The embodiments herein exhibit at least the following technical advantages. Other advantages may also be possible.

The property-based framework for automatically generating reduced-ISA hardware directly operates on a given arbitrary RTL or gate-level netlist, uses property checking to identify gates that are guaranteed to not toggle if only a reduced ISA needs to be supported, and automatically eliminates these untogglable gates to generate a new design. This is the first such framework for automated generation of reduced-ISA hardware.

The framework can be used to generate reduced-ISA hardware for several RISC-V variants for an Ibex core. A 14% gate count reduction is possible when the core is optimized for the subset of instructions required by a set of MiBench workloads. Reduced-ISA variants generated by the framework that support a limited set of ISA extensions can provide 10%-47% gate count benefits. Even optimizing the processor to support its full ISA leads to a 9% area reduction, since the framework removes hardware with unreachable states in the original design.

The framework can even be used on obfuscated designs. For an obfuscated Cortex M0 netlist, a 20% area reduction and 18% gate count reduction is observed compared to the baseline core for supporting the instructions in the MiBench benchmarks, demonstrating the applicability of the framework to obfuscated designs.

The approach herein is scalable. The framework has been applied successfully to a 100,000-gate RIDECORE design. The resulting reduced-ISA variants show 14%-17% gate count reduction. More than twice as many gates are reduced for RIDECORE as for Ibex.

The approach is also widely applicable. It can be used generate to bespoke Ibex and RIDECORE processors customized for different MiBench and embedded sensor benchmarks, showing 41%-84% and 5%-9% gate count reduction, respectively. Unlike previous work that disallows a number of important instructions, simulates overly-conservative states to prevent state space explosion, and focuses on a small openMSP430 core, this methodology can support arbitrary instructions and naturally scales to at least an order-of-magnitude larger designs.

Further, this approach can be generalized beyond just automatically generating reduced-ISA components. In principle, any hardware design that can be described in a netlist or similar format and where desired properties (e.g., elimination of floating point component, support for an n-bit data path) can be defined programmatically, can have its component count and/or gate count reduced.

II. ADVANCES OVER CONVENTIONAL TECHNIQUES

A body of work and commercial effort exists on application-specific instruction processors (ASIPs) and extensible processors (processors with user-customizable instruction sets), including those on design methodologies for generating such processors. Tensilica's Xtensa processors, for example, allowed user-specified extensions (using TiE) to the Xtensa base instruction set using automated customization tools. ARC allowed designers to add custom instructions using ARChitect Processor Configurator. Several MIPS processors allow application-specific extensions. ARM supports Arm Custom Instructions and associated software development tools. Codasip allows optional or custom hardware extensions to a RISC-V core supporting the standard ISA.

The embodiments herein different in at least three aspects. First, previous works are focused on allowing new instructions to be added to a design that implements at least a base or a standard ISA. The embodiments herein are focused instead on automatically removing hardware support for instructions, including instructions in the base ISA. Second, prior automatic customization frameworks are tied to a given design. For example, Codasip supplies its own RISC-V cores as modifiable CodAL models (Codasip's processor-modeling language), which can then be customized using Codasip's tools (e.g., Codasip Studio). Tools from Tensilica, MIPS, and ARC were similarly specific to their own processors. In contrast, the property-driven framework takes as an input an arbitrary design, including even gate-level netlists and obfuscated designs, and generates its reduced-ISA version automatically. Third, prior frameworks are primarily based on parameterization and metaprogramming. The approach is fundamentally different—it identifies gates in the original design that are not needed for the specified reduced-ISA subset and then eliminates them automatically.

There is some work demonstrating that reducing supported ISA can lead to efficiency benefits. However, these works do not show how to generate reduced-ISA hardware. The embodiments herein can automatically generate reduced-ISA hardware starting with a given arbitrary base design.

Some prior work uses a gate-level symbolic analysis-based approach to generate a design customized for a given application. It is unclear if a symbolic analysis-based approach can be used to generate reduced-ISA hardware; at the very least, a processor customization approach would require significant modification to do so. The embodiments herein develop a different and novel property checking-based approach to generate reduced-ISA hardware.

Further, property checking has had a rich history in hardware verification. There has also been some work on synthesizing property checks directly into hardware. The embodiments herein use property checking directly in the hardware synthesis flow to perform automated hardware transformations, specifically focused on automatic generation of reduced-ISA hardware. This is the first use of property checking in automating hardware optimization. Property-attached gate libraries, where properties are directly attached to gates, are also developed. These property-attached gates can then be used for optimization of arbitrary designs that use the gate library. No other work uses property-attached gate libraries either for verification, synthesis, or optimization.

III. MOTIVATION

In FIG. 2, Table I shows the number of instructions that are supported by the Ibex RISC-V core, as well as the number of RISC-V instructions used across several MiBench benchmark collections compiled to RISC-V using gcc 9.2.0. Each collection (i.e., networking, security, automotive) uses only a fraction of the instructions supported by the Ibex core. In fact, only 68% of the base ISA is used to support all the collections. This suggests that there may be significant opportunity to customize the Ibex core for a reduced ISA if the goal is to target only MiBench benchmark collections. Table I shows that the opportunity may be even greater for the Cortex-M0 core—the higher opportunity stems from a richer base ISA (ARMv6-M) with 83 instructions versus 78 instructions supported by Ibex. Only 60% of the ARMv6-M base ISA is used to support all the collections. Similar opportunity exists when an IP supporting multiple ISA extensions is used in a setting where a subset of extensions is not needed. Table I shows that the number of instructions supported by Ibex implementing different RISC-V ISA extensions can vary by almost 2. The variation can reach 4 for IPs that implement more extensions than Ibex (e.g., Ibex does not implement floating point or atomics extensions). The ability to easily transform an IP for a reduced-ISA variant could lead to significant benefits.

It may also be desirable to support automatic generation of reduced-ISA hardware to eliminate support for deprecated or rarely-used instructions. The number of instructions in an ISA keeps increasing over time, with each instruction contributing some overhead in an IP that implements the entire ISA. Unsurprisingly, many of the older instructions are not used over time (or used rarely). A study of x86 applications showed that more than 500 instructions were never used, and thus contribute unnecessary overhead. The ability to automatically generate reduced-ISA hardware can eliminate this overhead by removing support from an IP for rarely-used instructions.

Instructions are often diagnosed (post-design or in-field) as having buggy implementation—one need only look at errata sheets for processors—or as causing security vulnerabilities. Common Vulnerabilities and Exposures (CVEs) routinely identify instructions causing vulnerabilities. Notorious examples abound, including correctness or security vulnerabilities due to FDIV, TSX instructions, RDRAND and RDSEED, SWAPGS, etc.

Eliminating support for these instructions in the next version of a design through automatic generation of a reduced-ISA IP from an existing IP may fix the defect or vulnerability and increase efficiency at the same time, without requiring intrusive hardware changes. The approach is particularly attractive when a microcode ROM—which can be used to eliminate support for instructions by changing the microcode—is not available (many processors do not support microcode ROM because a microcode ROM can take up to 20% of the die area in some low-power designs) or when a change in the microcode cannot fix the problem. A reduced-ISA IP may also be desirable to preventively eliminate instructions that may cause security vulnerabilities (e.g., exploits due to indirect jumps are well known) or whose implementation may not have been fully verified.

Finally, some instructions may be diagnosed in the field as being expensive (e.g., several AVX instructions were discovered to routinely cause voltage emergencies leading to large performance degradation). Such instructions can be automatically eliminated from the IP through automatic generation of reduced-ISA hardware.

IV. PROPERTY-DRIVEN FRAMEWORK

The embodiments herein introduce a property-driven analysis and transformation (PDAT) framework to generate reduced-ISA hardware. PDAT takes as input a gate-level netlist of a synchronous digital circuit and an execution environment for that netlist, which is expressed using temporal logic formulas, and outputs a transformed netlist that is equivalent to the original netlist with respect to the execution environment. The netlist transformation is driven by identifying unused gates and gates that can be transformed into simpler gates (e.g., XOR replaced with INV).

PDAT uses formal property checking methods to analyze a netlist and identify cells that adhere to one or more invariants (e.g., output of the cell is always the same value T) within the context of the specified execution environment. The execution environment is specified using temporal logic formulas, and is related to the co-language of top-level input signals. Next, these cells are transformed, typically through rewiring, based on which invariants hold. This intermediate 'rewired' netlist is then resynthesized, allowing logic synthesis tools to make optimizations based on the rewiring. The resynthesized netlist is functionally equivalent to the original netlist when used within the specified execution environment.

Note that the collection of infinite-length sequences of characters from an alphabet $\Sigma$ is denoted by $\Sigma^\omega$. An $\omega$-language over the alphabet $\Sigma$ is simply a subset of $\Sigma^\omega$. Alternatively, an $\omega$-language is a collection of functions that map $\mathbb{N} \to \Sigma$.

Figure 3:
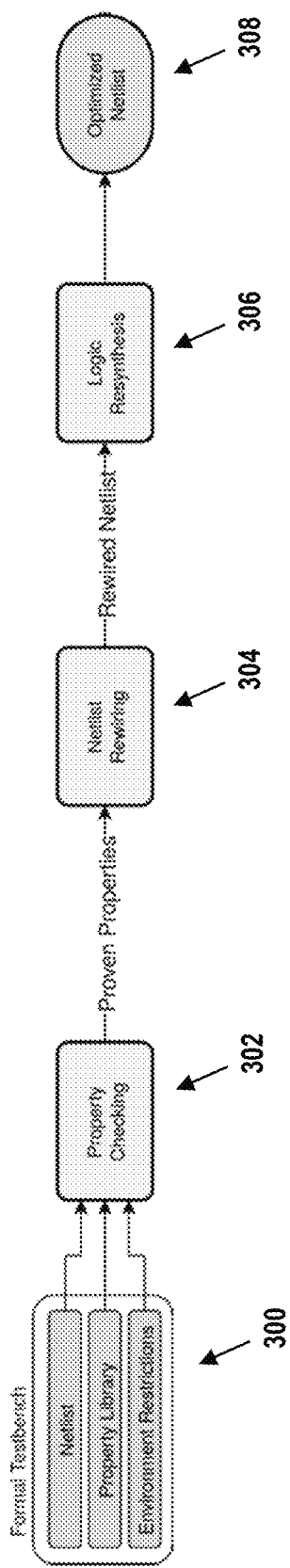
FIG. 3 depicts a property driven analysis and transformation procedure, in accordance with example embodiments.

A high-level block diagram for PDAT is provided in FIG. 3. As noted, PDAT inputs 300 include a netlist of the circuit to be optimized, a property-attached gate library, and a collection of environment restrictions. PDAT inputs 300 are encoded in a testbench suitable for formal analysis. The three PDAT pipeline stages 302, 304, and 306 transform the input netlist into a new, optimized netlist 308, for the specified execution environment. Below, the different stages of the PDAT framework are described in detail.

A. Property Checking Overview

Consider a synchronous digital circuit with m binary-valued inputs and n binary-valued registers represented as a non-deterministic transition system. A transition system is a tuple (S, Act, -→, I, AP, L), where:

S is a set of states.
Act is a set of actions.
-→⊆S×Act×S is a left-total transition relation. The shorthand $$s \xrightarrow{a} s$$

indicates that (s, a) is related to s by →. Similarly, s→indicates the collection of states that are related to (s, a) by →.
$S_0 \subseteq S$ is a collection of initial states.
AP is a set of atomic proportions.
$L:S \rightarrow 2^{AP}$ is a labeling function.

A synchronous digital circuit can be modeled as a transition system as follows:

$S=2^{m+n}=2^m \times 2^n$ is the collection of all possible input and register values. For a set R, $2^R$ is the power set of R.
Act=$2^m$ is the collection of all possible inputs.
-→: $((i, l), i_{next}) (i_{next}, \delta(r, i))$ where $\delta$ is the register update function for the digital circuit, and r is the evaluation of the registers for state (i, l).
$S_0$ is the collection of states that the circuit can be in upon completion of a reset sequence.
AP is the collection of all nets in the circuit.
L is the function that maps a state s to the collection of nets that evaluate to logical T when the circuit is in state s.

A property for this automaton model of the circuit, then, is a collection of infinite sequences of states. In other words, it is an co-language over the alphabet S (i.e., property $P \subset S_0$). An execution of the circuit model is an infinite sequence $s_0, s_1, \ldots \in S_0 \times S_\omega$ such that, for all indices i>0, $$s_i \in \text{Post}(s_{i-1}) = \bigcup_{a \in Act} s_{i-1} \dashrightarrow .$$

Execution e satisfies property P if and only if e∈ P, and this is denoted as e F P. A set of executions, E, that satisfies a property P is denoted as E F P, if e F P for all e∈ E. The set of all executions of transition system TS is denoted as $E_{TS}$.

Property checking stage 302 is used to evaluate whether a design satisfies properties that enable optimizations. For example, for a transition system TS, a property, P, can be encoded which checks whether a net, n, is always T by setting P={s∈ S|n∈ L(s)$^\omega$}. If $E_{TS}$ F P, then n is always T and can be replaced by a constant-driver cell.

Further, restrictions on the execution environment can be encoded directly into properties which, for transition system TS, is an element of $2^{E_{TS}}$. For example, consider a microprocessor core for which it is desirable to eliminate support for a certain instruction. Any execution that fetches that instruction can be removed from the execution environment by considering only executions that do not fetch the instruction.

B. Setting up the PDAT Framework

PDAT inputs 300, as indicated in FIG. 3, are (a) a gate-level netlist—synthesized to either a physical standard cell library or a logical standard cell library (e.g. GTech)— for the sequential digital circuit design, (b) a property-attached gate library which contains properties that capture invariants about gates, and (c) a formal testbench that instantiates the netlist, binds the property-attached gate library to the netlist, and restricts the execution environment.

The property-attached gate library used herein is written in SystemVerilog, and its properties are expressed as SystemVerilog Assertions (SVA). An example property module from this library is depicted in FIG. 4 as Listing 1. Property modules are bound to each instance of the associated cell-type in the netlist (e.g., the module and 2 properties is bound to each two-input AND gate in the netlist). The properties check for semantically meaningful invariants on the gate inputs and outputs in what is termed gate-level property checking. For example, the property and_in_A2_A1 checks that if the cell's A1 input is T, then so is the cell's A2 input (at all times and in every possible execution). If this property is satisfied, then it means the associated cell can be rewired by assigning its output to the net driving A1, without impacting the functional behavior of the design. An advantage of property checking at the gate level, as opposed to a higher level of analysis, is that the property-attached gate library can be used to enable optimizations for any design synthesized to a standard cell library, including designs for which the microarchitecture is not known or understood (e.g., obfuscated designs).

SVA allows properties to be used to restrict the executions considered by the property checking tools. This is done with the assume operator, which informs the property checking engines that only executions which satisfy the assumed property should be considered. If an execution violates an assumed property, then whether a gate-level property is satisfied by this execution is irrelevant to the property checker. That is, if execution e violates (does not satisfy) an assumed property, P, then e satisfies asserted property, Q.

Figure 5:
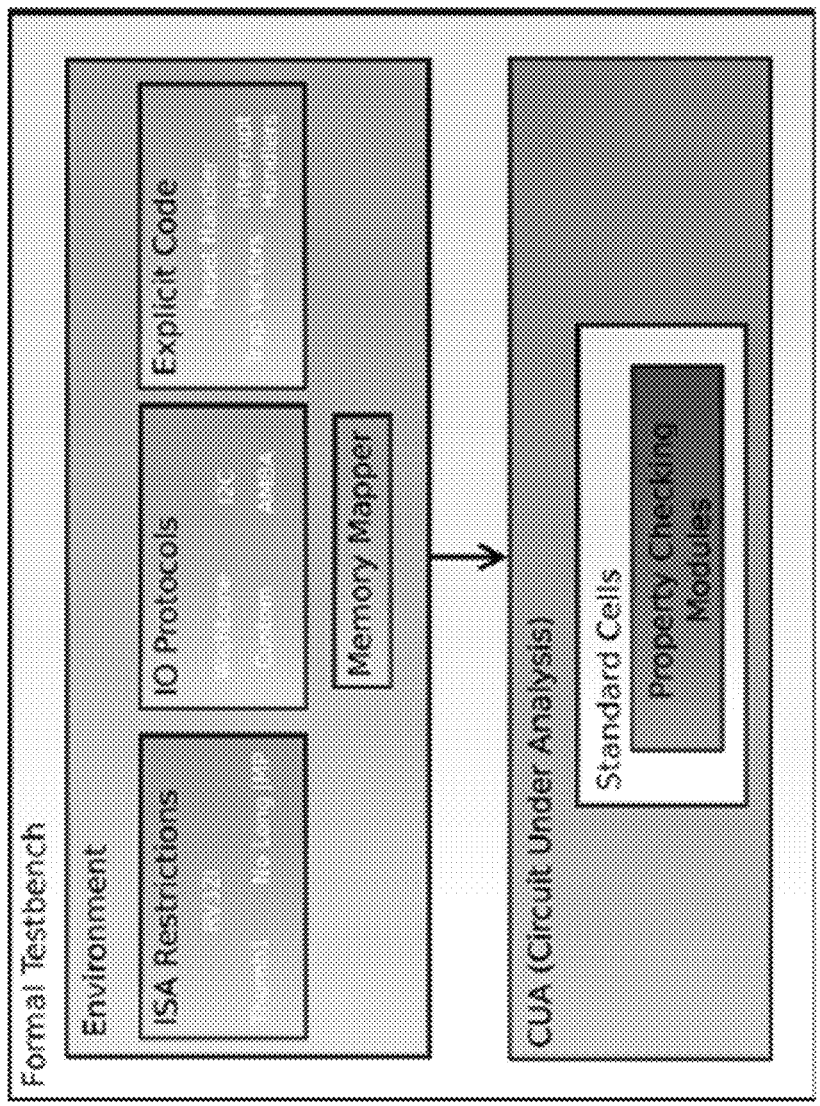
FIG. 5 depicts a component diagram of formal testbench input, in accordance with example embodiments.

FIG. 5 depicts the versatility of this approach. Encoded are ISA restrictions (e.g., removal of instructions, removal of ISA extensions), restrictions on I/O protocols (e.g., bounded or deterministic memory latencies), explicit mapping of specific code sequences to address regions (e.g., reset handlers, trap vectors, entire programs, or operating system code), etc.

C. Property Checking Stage

Property checking stage 302 is the first and generally most time-consuming stage of the PDAT pipeline. The property checker takes the netlist, property library, and formal testbench as inputs, transforms the netlist into a model, such as a transition system, and transforms the properties and environmental restrictions into structures useful for property checking, such as Büchi automata, with which it can check to see if the properties hold or are violated by allowed executions. Property checking stage 302 produces a list of properties that are proved to hold on all allowed executions. For the embodiments herein, Mentor's Questa Formal software was used as the property checker.

D. Netlist Rewiring Stage

In netlist rewiring stage 304 of the PDAT pipeline, the original netlist is rewired based on the list of proved properties created in property checking stage 302. Note that by limiting this stage to rewiring, no cells are removed, transformed, or added to the netlist. This stage modifies cell port listings and adds assignment statements to the netlist. The rewired netlist is passed to the next stage of the PDAT pipeline. If no invariants about a cell were proved during the property checking stage 302, then that cell is not changed during this stage E. Logic Resynthesis Stage In logic resynthesis stage 306, the rewired netlist is resynthesized using a standard synthesis flow. Logic synthesis is used to remove and simplify constrained cells, since logic synthesis tools are ostensibly very good at this. This stage produces a transformed netlist, which is optimized with respect to the execution environment encoded in the formal testbench PDAT input. The result is optimized netlist 308.

V. GENERATING A REDUCED-ISA DESIGN

An illustrative example of PDAT's capabilities is provided by using it to generate a reduced-ISA design from a core implementing the RISC-V RV32i ISA (RV32i only has fixed-length instructions). For simplicity of exposition, it is assumed that the core's program counter has its two least significant bits wired to ground, resulting in all instruction accesses being word aligned. First, ISA instructions are encoded as properties, as shown in FIG. 6 as Listing 2 at lines 2 to 11. These properties are used to restrict the execution environment of the core. There are a number of ways to restrict the execution environment, including using assumptions placed on the core's instruction or memory ports, or the programs that can execute on the core. In this example, the restrictions are placed directly onto programs themselves, shown in FIG. 7 as Listing 3.

With these modules and properties, the formal testbench for the RV32i core can be built, shown in FIG. 8 as Listing 4. The testbench's ports, omitted for brevity, mimic those of the RISC-V core, minus the pc and instr, which are instantiated inside the testbench on line 5. In addition to instantiating the program memory and the core, in lines 9 to 11 gate-level properties are bound to every gate in the netlist. Sometimes additional logic or assumed properties are instantiated in order to properly drive or constrain other core inputs, such as the data memory interface and interrupts. For example, simulating a memory bus protocol with non-deterministic response latencies may be helpful in order to facilitate core memory accesses.

Once the testbench is built, it is fed to the PDAT pipeline (as shown in FIG. 3). The module in Listing 3 allows the property checker to drive the core with any program composed from the desired subset of the RV32i ISA (i.e., any RV32i instruction that is not 'unwanted'). The assumption as_const ensures that the program remains stable across all time-steps of the formal 'execution' (but its initial value is non-deterministic and allowed to be any program composed of allowed RV32i instructions). In other words, the rv32i_pmem module imposes a strong consistency guarantee in which all reads to the same program memory address return the same (albeit non-deterministic) instruction from the ISA subset.

The approach described above—based on program-based constraints—is relatively straightforward for ISAs with fixed-width instructions, such as RV32i. However, many systems do not have fixed-width instructions. As such, in addition to program-based constraints, as shown in Listing 3, port-based constraints are supported, where constraints are placed on a core's instruction memory port, as are cutpoint-based constraints, where constraints are placed on a core's internal nets.

Figure 9:
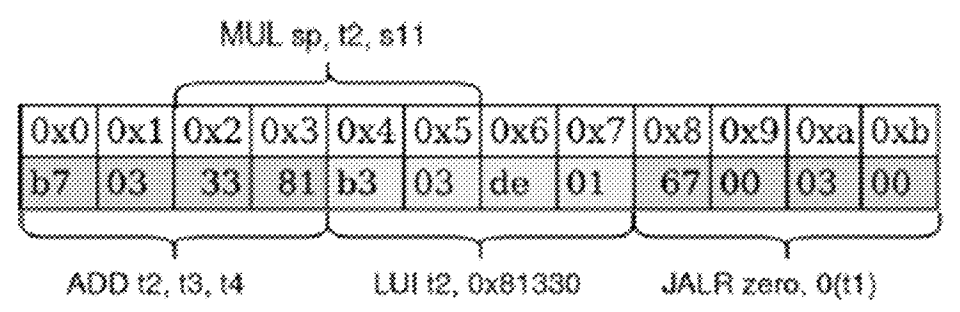

To illustrate the use of cutpoint based constraints, a RISC-V core implementing the RV32imc ISA is considered. The RISC-V c-extension consists of 2-byte instructions in addition to the base ISA's 4-byte instructions, and thus the core allows branches and jumps to 2-byte aligned addresses. Suppose that a goal is to generate a core with the m-extension (integer multiplication, division, and remainder instructions) removed. If program-based constraints are used, then the binary code fragment in FIG. 9, which does not explicitly include any m-extension instructions, will be considered as part of a valid execution during property checking stage 302.

This 'program' will jump to the address stored in register t1 when its execution is being analyzed. If that address is 0x02 (the property checking tool can create instructions that make t1 0x02), then the core will fetch and execute a multiply instruction. Thus, the Property Checking Stage will report that the multiplier gates are required for the execution and, therefore, should not be rewired, even though the execution environment specifically removes m-extension instructions, including multiply instructions. So, although the 'program' fragment in FIG. 9 consists of three word-aligned 4-byte instructions from the allowed ISA subset, because the ISA subset allows indirect branches and the base ISA has variable length instruction encodings, the property checker will, in its exploration, feed non-word aligned instructions that are not part of the allowed ISA subset to the core. Note that if indirect branches are not included in the desired ISA subset, then program-based constraints could be used, as all branches would lead to valid instructions within the desired ISA subset. It is the combination of variable-length ISA (and thus the existence of non-word aligned instructions) and indirect jumps (and thus the inability to reason statically about branch target addresses) that makes the use of program-based constraints problematic.

Figure 10:
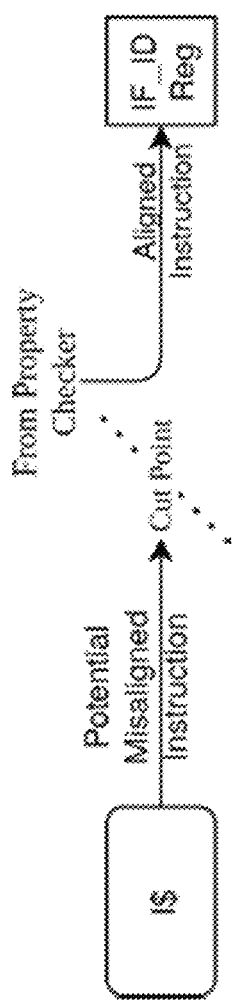
FIG. 10 depicts a cutpoint used for design constraints, in accordance with example embodiments.

A cutpoint is defined as a net whose value is determined by the property checking tool rather than its netlist drivers (so called because, in effect, the net is cut from its true driver). Cutpoints allow resolution of the 'misaligned instruction' issue described above. If the netlist is not obfuscated (i.e., there is visibility into the netlist), a cutpoint can be inserted somewhere in the design and then use environment constraints to constrain its value. FIG. 10 shows how a cutpoint can be used to place a valid, aligned instruction into the fetch-decode pipeline register, rather than the potentially unaligned instruction coming out of the instruction cache.

Port-based constraints are placed only on a system's visible input ports and thus are similar to program-based constraints in that, unlike cutpoint-based constraints, they can be applied without knowledge of the core's microarchitecture. Unlike program-based constraints, port-based constraints impose no memory consistency model for instruction memory. When using port-based constraints, distinct reads from the same program memory address may produce different instructions, while this can never occur when using program-based constraints. Port-based constraints are lightweight, enabling the property checker to consider streams of instructions rather than entire programs, ameliorating memory issues associated with generating and storing entire (potentially large) programs as is required by program based constraints.

Using an appropriate combination of program-, port-, and cutpoint-based constraints, reduced-ISA hardware can be generated from any base design. Program-based constraints are mostly useful for systems with limited program memory, since generating and storing entire programs during the property checking stage can be costly. However, program-based constraints allow constraints to be placed on relationships between instructions, such as ensuring all direct branches (i.e., PC+offset) point to valid instructions. Port-based constraints do not incur the memory overhead associated with program-based constraints. However, they make constraining relationships between instructions difficult, since port-based constraints simply drive the core with a stream of instructions. In the presence of indirect jumps and variable length instructions, cutpoints provide the best means of constraining the execution environment, since they can be used to decouple instruction execution from instruction fetch, ensuring that all executed instructions belong to the desired ISA subset.

VI. EXPERIMENTAL METHODOLOGY

FIG. 11 provides, in Table II, features of three cores that were used for evaluations. The first core, Ibex (formerly zero-riscy), is a scalar, in-order, 32-bit RISC-V core that implements the c, m, Zicsr, and Zifencei-extensions. The latter two extensions are collectively referred to as the 'z-extension'. The two-stage pipeline version of Ibex was used. IRQ and NMI interrupt lines were disabled for the analysis so that the results are conservative (since gates removed in the debug, watchdog, and interrupt logic from the baseline design are not counted). To avoid issues with misalignment and indirect branches, cutpoint-based constraints were used to generate reduced-ISA Ibex variants (see above).

The second core, RIDECORE, is a two-way, out-of-order 32-bit RISC-V core that implements most of the RV32i base ISA, as well as the multiply instructions from the co-extension (it does not implement hardware division or remainder instructions). Since RIDECORE has word-aligned instruction and does not allow branching to non-word-aligned addresses, port-based constraints are used to generate reduced-ISA designs.

The third core, ARM's Cortex M0, is a three-stage core implementing the ARMv6-M ISA. An obfuscated version of this core is analyzed and constraints are placed directly on the ports to generate reduced-ISA designs (since, due to obfuscation, constraints cannot be placed on pipeline registers as was done for Ibex).

RTL and netlists were synthesized into gate-level netlists using the Synopsys Design Compiler. Compilation was done with the -ungroup_all option. A commercial 45 nm NAN-GATE standard cell library was used. Property checking was performed using Mentor's Questa Formal software version 2019 4 1

To confirm the equivalence between N, the original netlist, and $N^I$, the rewired (reduced-ISA) version with respect to the constraints (i.e., the reduced ISA), a copy was made of the formal testbench input to PDAT's property checking stage with the following changes.
1. Remove all property-attached gate library module bindings, as they are not needed for verification.
2. Instantiate copies of the netlists N and $N^I$.
3. Create duplicate variables for all design outputs.
4. Keep all assumed properties and structures related to execution environment restrictions. Duplicate all cutpoints so that they constrain both N and $N^I$ with the same values.
5. For each register r in $N^I$, if r takes an indeterminate value after the reset sequence, then add an environmental restriction that assumes that the instance of r in N and the instance of r in $N^I$ have the same initial value, although this initial value is non-deterministic.
6. For each circuit output, o, create and assert a property which states that the value of o in N and in $N^I$ are the same at all times for all executions.

This modified testbench is then run through a property checker (e.g., Questa Formal). If all of Item 6's properties are proved, then $N^I$ is correctly derived from N. If not, then there was an error in either the property checking stage or the netlist rewiring stage. Regardless, it was found that the reduced-ISA versions and bespoke versions are equivalent to the original designs for the reduced ISA.

VII. RESULTS

A. Automatic Generation of Reduced-ISA Microprocessors

Figure 12:
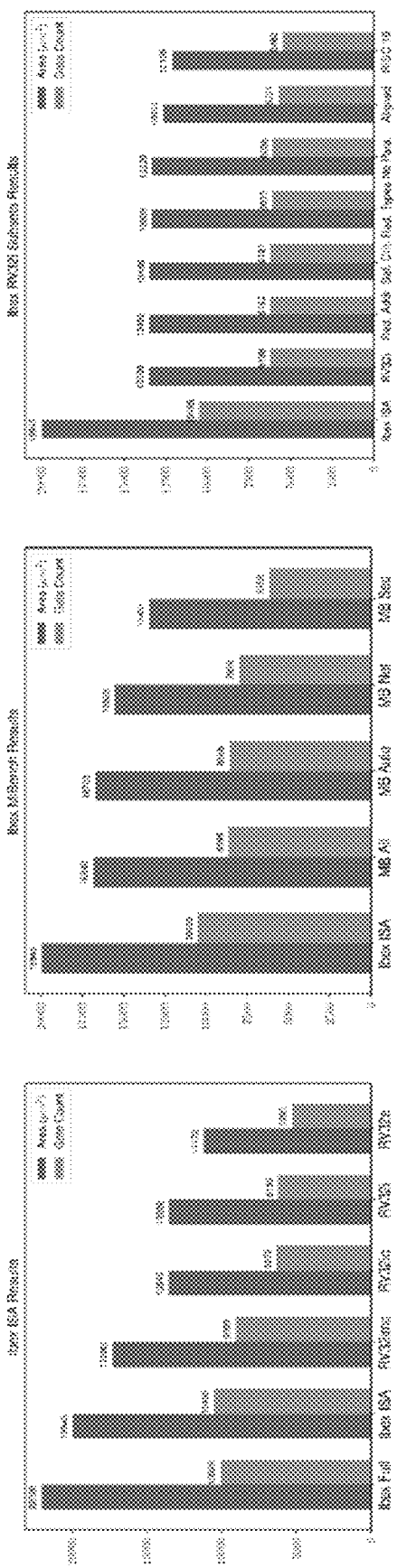
FIG. 12 depicts area and gate count for a number of Ibex variants, in accordance with example embodiments.

FIG. 12 presents results for reduced-ISA variants of Ibex. An immediately interesting result is the area difference between the 'Ibex Full' (design before application of PDAT) and 'Ibex ISA' (PDAT run without ISA subsetting) core variants. By restricting the execution environment to the full set of instructions officially supported by the core there is still nearly 10% area savings. This seemingly counterintuitive result is due to the inability of standard logic synthesis tools to understand which states are unreachable when only valid ISA instructions are provided as input. PDAT identifies such states, since it explore the state space of the design for a given environmental constraint. The logic corresponding to such states is marked as unneeded by PDAT and subsequently eliminated when the environment is constrained to only valid ISA instructions.

PDAT allows generation of Ibex variants that support official RISC-V ISAs, but which cannot be generated using Ibex's parameterization options. The RISC-V ISA variants in the left graph of FIG. 12 (except Ibex ISA) are not supported directly by Ibex. Specifically, Ibex does not support disabling the z-extension and c-extensions via parameters. This means that cores supporting only the RV32imc, RV32ic, RV32i, and RV32e ISAs can only be generated using a process like PDAT, which automatically removes unneeded hardware, or by manually modifying the Ibex RTL. However, the option of manually modifying RTL is often not available (e.g., when only a netlist—obfuscated or open—is available). Also, manual RTL modification may lead to bugs and add IP qualification, verification, and physical design costs for the new RTL IP.

PDAT-based removal of ISA extensions results in substantial area and gate count reductions, with the exception of c-extension removal. The RISC-V c-extension includes 16-bit versions of RV32i's 32-bit instructions. As these instructions are, for the most part, different encodings of existing instructions, it makes sense that the marginal resources needed to implement the c-extension are relatively minor. Despite this small implementation cost, code size for MiBench benchmarks is reduced by 9%, on average, when they are compiled with the c-extension. PDAT analysis, then, shows that implementation of the c-extension is likely a good use of core area.

RISC-V's RV32e variant supports the same instructions as the RV32i ISA; however, it only has 16 instead of 32 general purpose architectural registers. Transforming RV32i instruction properties to RV32e instruction properties can be done in a straightforward manner by adding an additional property that ensures that the register fields of each instruction have their most significant bits cleared.

In addition to generating Ibex core variants that support official RISC-V ISA variants, cores that support custom ISA subsets can also be generated, such as the ISA subsets needed to support the MiBench benchmark collections discussed in Table I. These subsets show that substantial area reduction can be achieved by removing instructions from ISA extensions. The MiBench Networking and MiBench Security subset cores are over 3% and 11% smaller, with 5% and 12% fewer gates, respectively, than the PDAT baseline RV32imc ISA.

These results are even more significant when compared against the PDAT Ibex ISA (RV32imcz) variant. In this case, the MiBench All ISA variant generated by PDAT is 15% smaller and has 18% fewer gates than the PDAT generated Ibex ISA core variant (and 23% smaller with 14% fewer gates than Ibex without PDAT). These significant improvements are likely attributable to the large portion of the m-extension that is not used. For example, the co-extension supports an instruction to place the top 32-bits of a 64-bit multiplication result into a register. This instruction is not used in the benchmarks, which means the top 32 bits of the multiply can be safely ignored, decreasing the size of the required multiplier by approximately one half.

Core variants that support ISAs with special properties unrelated to specific benchmark collections were also generated. For example, restricting Ibex to only word-aligned memory accesses allows over 6% area and 7% gate count savings over the baseline RV32i PDAT variant. However, for the most part, these special purpose ISAs provide no significant area or gate count advantage over the RV32i PDAT variant baseline. Nevertheless, such ISA variants may still be interesting, as there may be legitimate reasons to limit allowed instructions to such ISA subsets, such as safety, reliability, or security.

The 'RISC 16' variant supports the c-extension's ADD, ADDimm, AND, XOR, LUI, LW, SW, BEQZ, and JALR instructions, making it roughly equivalent to the RiSC-16 teaching ISA. The Ibex 'RISC 16' variant is 10% smaller and uses nearly 12% fewer gates than the Ibex RV32i variant.

B. Reducing Obfuscated Designs

Figure 13:
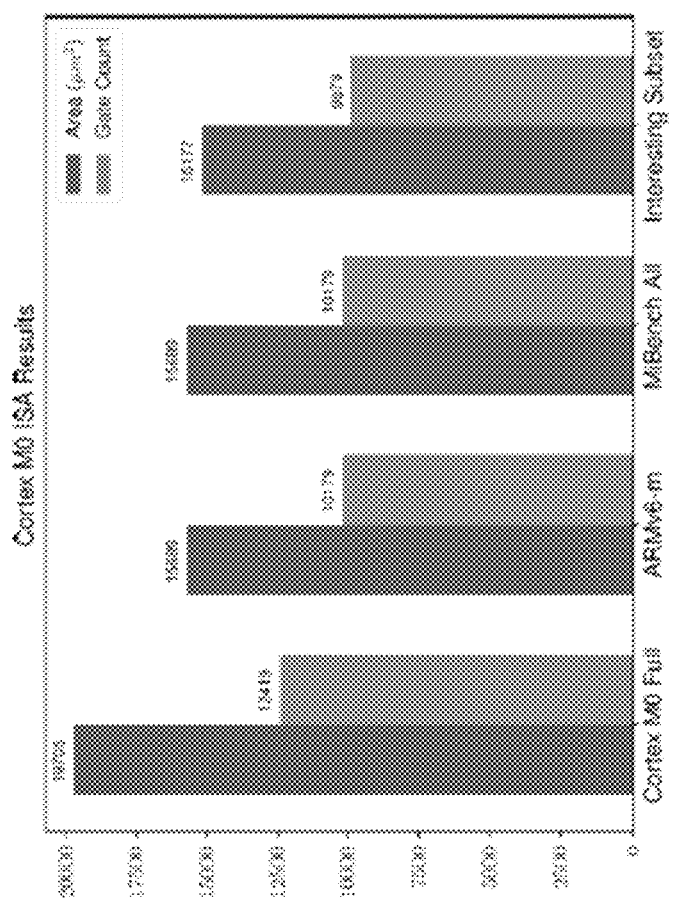
FIG. 13 depicts property driven analysis and transformation results for an obfuscated Cortex M0 netlist, in accordance with example embodiments.

As discussed above, PDAT can be used to analyze obfuscated cores. FIG. 13 shows PDAT results for an obfuscated version of ARM's Cortex M0 microcontroller. Again, there is substantial area and gate count reduction (20%, and 18%, respectively) simply by performing PDAT analysis with the core's full ISA. Some of the unneeded core area may be attributable to ARM's obfuscation techniques. Somewhat surprisingly, the 'MiBench All' ISA, consisting of all instructions needed to implement the MiBench benchmarks (Table I), has the same area and gate count as the 'ARMv6-M' variant. It is possible that this is due to the fact that the MiBench subset includes two and four-byte instructions, as well as indirect branches. As a result, the best way to constrain Cortex M0 for such a subset is with cutpoints. However, as the Cortex M0 netlist is obfuscated, port-based constraints are used, which limits the opportunities from ISA subsetting, since arbitrary 'programs' composed of those instructions can lead to situations where non-ISA subset instructions enter the core's execution pipeline, as indirect jumps to 2-byte aligned address are allowed, while 4-byte instructions span such alignments. Further, whether an arbitrary program will result in such jumps is undecidable, and therefore program-based constraints are unable to solve this issue.

The 'interesting subset' is the base ARMv6-M ISA with select instructions removed, based on their relative lack of importance for a scalar, in-order uniprocessor (e.g., memory ordering instructions, inter-core signaling instructions), as well as the multiply instruction, and all seven of the four-byte instructions. As all instructions in this ISA subset are 2-byte aligned (the minimum instruction length in the ARMv6-M ISA), this ensures that all branches (direct or indirect) point to valid instructions from the subset. This 'interesting subset' is a practical instruction subset for many embedded applications. The Cortex M0 variant that supports this ISA subset has 23% and 20% lower area and gate-count, respectively.

C. Scalability

Formal methods suffer from scalability issues due to state space explosion. PDAT has the same state space explosion problem, but unlike in hardware verification, it is not a critical issue for PDAT. Consider what it means for a model checker to fail to find a proof or counterexample for an asserted verification property—it means that the design is not verified and thus potentially buggy. Now consider what it means for a model checker to fail to find a proof or counterexample for an asserted PDAT gate-level property—it means that the gate will be untouched by rewiring (and that's it). The gate may still be removed during resynthesis, since resynthesis will remove gates that do not ultimately drive registers or outputs. The worst case for inconclusive analysis in PDAT's property checking stage is that the resulting transformed netlist may be less optimized than if the property's invariant was proved to hold.

Figure 14:
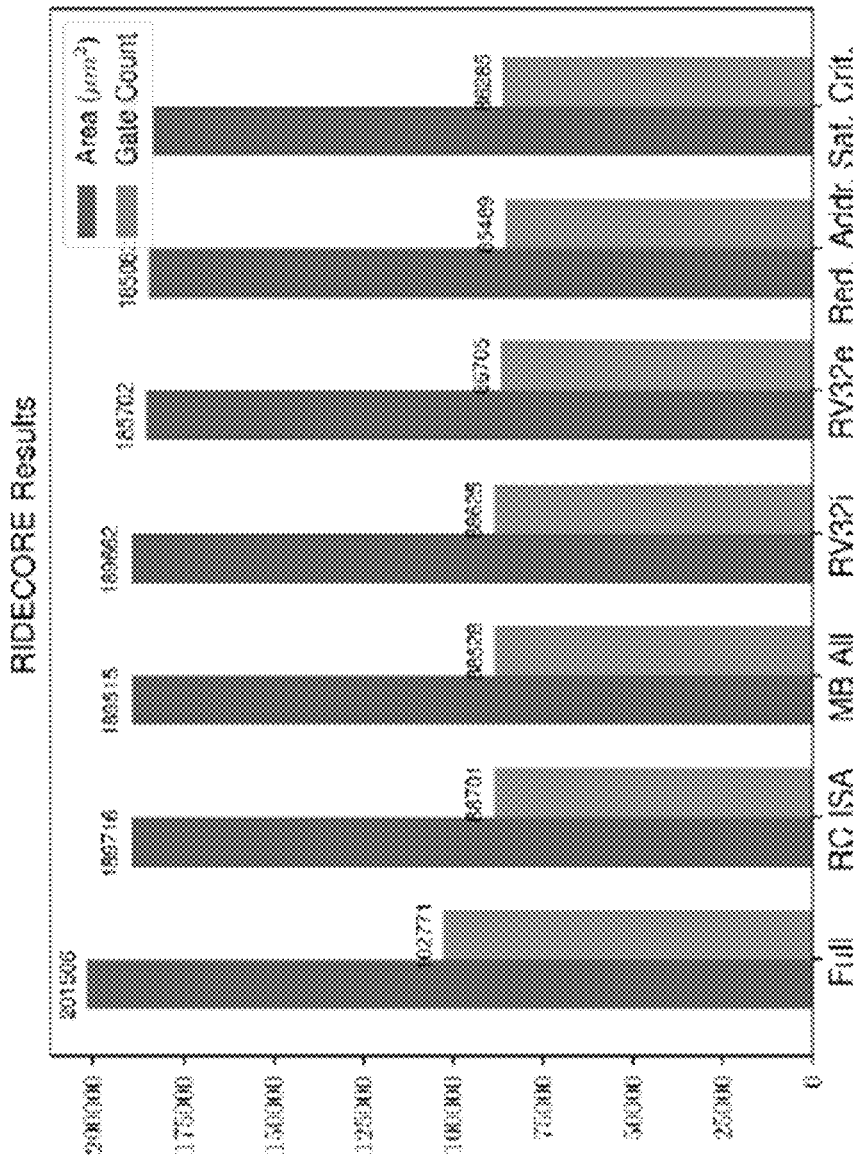
FIG. 14 depicts property driven analysis and transformation results for a number of RIDECORE variants, in accordance with example embodiments.

FIG. 14 shows the results of employing PDAT for RIDECORE, which is an order of magnitude larger than Ibex and Cortex M0. Results for RIDECORE are muted compared to Ibex. This is not surprising, since for example, the RV32e variant can remove half of the physical register file of an in-order scalar core such as Ibex, while it can only affect a smaller portion of RIDECORE's 96-entry physical register file, because 64 of the registers are used for storing results from non-committed instructions. In general, more of RIDECORE's area is dedicated to instruction-agnostic features (Table II) than it is for Ibex. Despite this, there still is an area improvement of 6% by simply running PDAT with the environment restricted to the full RIDECORE ISA. Other RIDECORE variants show modest improvements over the RIDECORE ISA variant in terms of percent area or gate reduction. However, in absolute terms, some of these improvements are in the same range as the improvements for Ibex. For example, Ibex RV32i and RV32e variants have a difference of 934 gates, while the RIDECORE RV32i and RV32e variants have a difference of 1920 gates, over 2 times the difference in Ibex.

Figure 15:
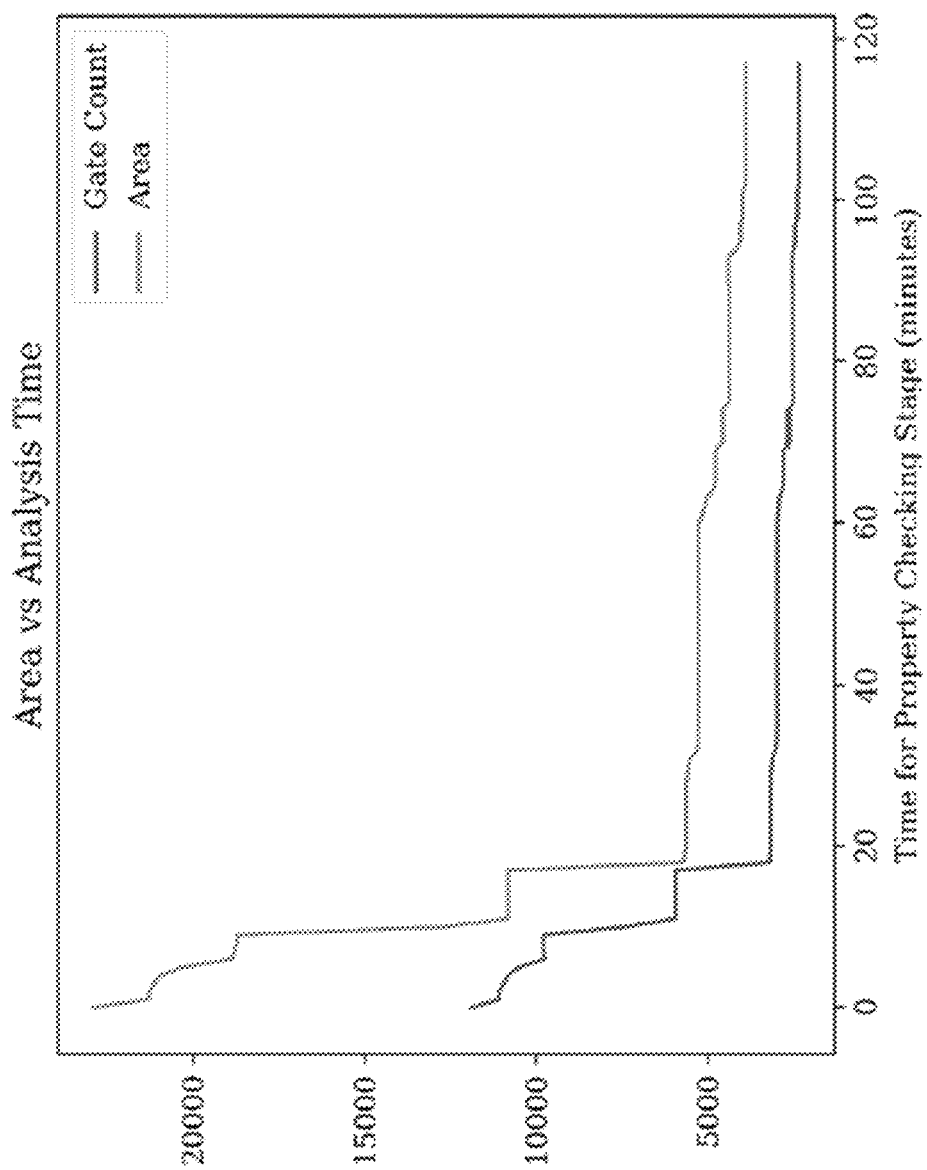
FIG. 15 depicts area and gate count of an Ibex variant as a function of synthesis time, in accordance with example embodiments.

As another measure of scalability, gate count change as a function of time devoted to property checking is shown in FIG. 15. The results show that the embodiments herein can be effective even with relatively small runtime.

D. Bespoke Processors

PDAT can be extended to generate bespoke processors. A bespoke processor is a core customized for a specific application by eliminating unneeded gates. A previous approach to bespoke processor generation relies on symbolic execution to explore the design's state space and identify gates that are guaranteed not to toggle. In order to deal with the path explosion problem, that approach disallows a number of important instructions, such as indirect jumps, and simulates overly-conservative states that cover multiple execution states, including some states that are not actually reachable by the target application. Also, the scalability of the approach is unclear; the work demonstrates bespoke variants of the small openMSP430 microcontroller (10 k gates).

PDAT can generate bespoke variants for the order-of-magnitude larger RIDECORE core, and can support arbitrary instructions. Using PDAT to generate bespoke processors requires modeling sequential consistency for some region of memory. Function return addresses are often stored in memory and directly affect program control flow. Thus, a region of memory must be modeled with sequential consistency in order to guarantee effective PDAT for bespoke variants. If sequential consistency is not guaranteed, then a program may jump to potentially arbitrary addresses when returning from a function, which can affect PDAT's ability to optimize the core.

To address this issue, programs are compiled with a custom linker script that includes four memory regions: 1) an executable program memory region, 2) a read-only data region, 3) a read-write sequentially consistent region, and 4) a read-write region with no consistency guarantees. All data that can be used for control flow, such as the program stack, are placed into the sequentially-consistent region. Also, data with initial values are placed in this region. All other writeable data are placed into the 'inconsistent' region. The read-only memory regions are generated for formal analysis using localparam qualified variables. For generating an inconsistent region, the formal analysis tool chooses arbitrary values. The sequentially-consistent region is modeled as a behavioral memory. With these regions of memory understood by both the linker and the formal testbench, executing PDAT on this testbench generates a core optimized to execute a specific application.

Figure 16:
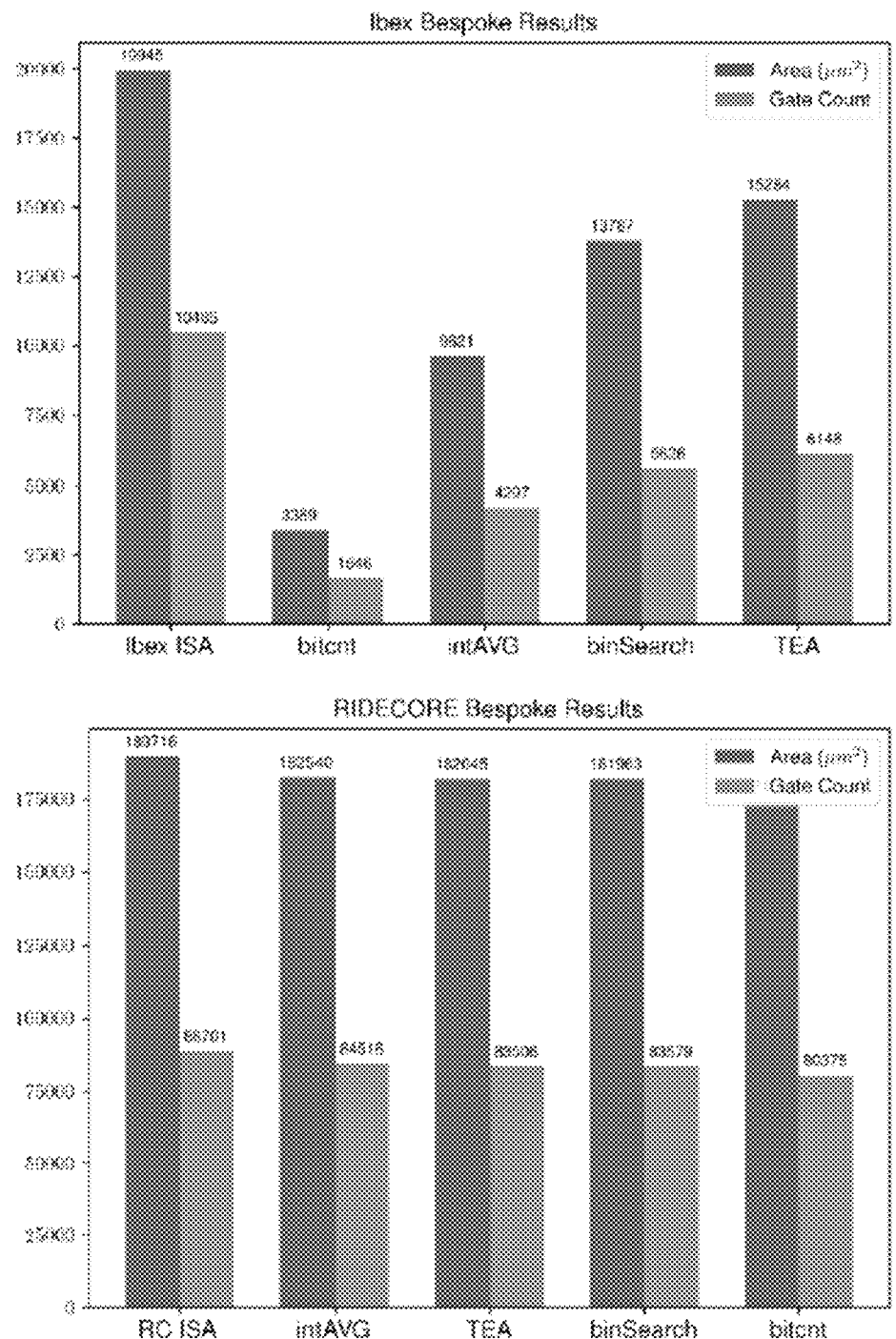
FIG. 16 depicts area and gate count for bespoke Ibex and RIDECORE variants, in accordance with example embodiments.

FIG. 16 shows results for bespoke Ibex and RIDECORE-variants for several MiBench and embedded sensor benchmarks. Up to 5.9 times and 6.4 times improvements in area and gate count for bespoke Ibex variants over the baseline RV32imcz PDAT variant are observed. RIDECORE results are more tempered, showing up to 10% and 22% improvement in area and gate count, respectively.

E. Enabling Marginal Cost Analysis

PDAT can also enable analysis of the marginal cost of implementing instructions (and, therefore, upper bound of PDAT benefits for a given ISA subset). In FIG. 17, Table III shows the number of gates needed to implement an "ISA" with one or two instructions (to enable us to understand the marginal cost of implementation for an instruction). The cost of implementing ADD and SW is small. The ADD instruction only needs to maintain the program counter and hardware associated with fetching and decoding one type of instruction. The SW instruction requires those same components, plus the hardware needed to write to data memory. This means that these core variants have no need for major structures such as the register file or the ALU (the SW calculates its address as the sum of an immediate value and a register value, the latter of which is always zero in this singleton ISA subset).

The core variant implementing the singleton ISA subset consisting of ADDI keeps nearly half of the core. Notably, this is significantly larger than the constant generating instructions (CGI) which, in RISC-V, consist of the LUI and ADDI instructions with source register set to the zero register. Similar to the SW singleton ISA, the CGI instructions do not require the ALU's adder. Adding the register-register ADD to the ADDI singleton ISA only increases the gates needed by 1%, indicating the large number of overlapping hardware structures needed by the two add instructions.

The 'ADDI+SW' ISA subset shows how cheap RISC-V instructions are to implement. The RISC-V ISA's binary encodings (for 4-byte instructions) have several features that make decoding instructions straightforward. For example, register operands are encoded in the same positions across all instruction formats, and other control information, such as ALU operation, is encoded directly into instructions. This is especially relevant for a core such as Ibex, in which decoding, register access, and ALU operations are all part of the same pipeline stage (i.e., no need to latch the decoded instruction's control signals or fetched operands). As such, the Ibex variant that supports only the ADDI and SW instructions uses only 1947 fewer gates than the Ibex variant implementing the entire RV32i base ISA. Smaller useful Ibex variants than the 'ADDI+SW' variant can be generated, but this likely requires removing architectural registers (e.g., the RV32e variant).

VIII. OVERVIEW OF IMPROVEMENTS

As diversity of customers and workloads increases, the need to customize hardware at low cost for different computing needs continues to increase. The embodiments herein focus on automatic customization of a given hardware, available as a soft or firm IP, through eliminating unneeded or undesired ISA instructions and instruction sequences. A property-based framework for automatically generating reduced-ISA hardware is presented. The framework directly operates on a given arbitrary RTL or gate-level netlist, uses property checking to identify gates that are guaranteed to not toggle if only a reduced ISA needs to be supported, and automatically eliminates these untogglable gates to generate a new design. A 14% gate count reduction is possible when the Ibex core is optimized using this framework for the instructions required by a set of MiBench workloads. Reduced-ISA versions generated by the framework that support a limited set of ISA extensions provided 10%-47% gate count reduction. It is also demonstrated that the framework is applicable to obfuscated designs. For an obfuscated Cortex M0 netlist, a 20% area reduction and 18% gate count reduction is observed for the MiBench benchmarks over the baseline core. When applying the framework to a 100,000-gate RIDECORE design, 14%-17% gate count reduction was observed, demonstrating scalability. The generality of the framework was established by generating bespoke Ibex and RIDECORE processors customized for different MiBench and embedded sensor benchmarks, showing 41%-84% and 5%-9% reduction in gate count, respectively. Unlike previous work on bespoke processor generation that disallows a number of important instructions, simulates overly-conservative states to prevent state space explosion and focuses on a small openMSP430 core, the embodiments herein can support arbitrary instructions and naturally scale to at least an order of magnitude larger designs.

IX. EXAMPLE OPERATIONS

Figure 18:
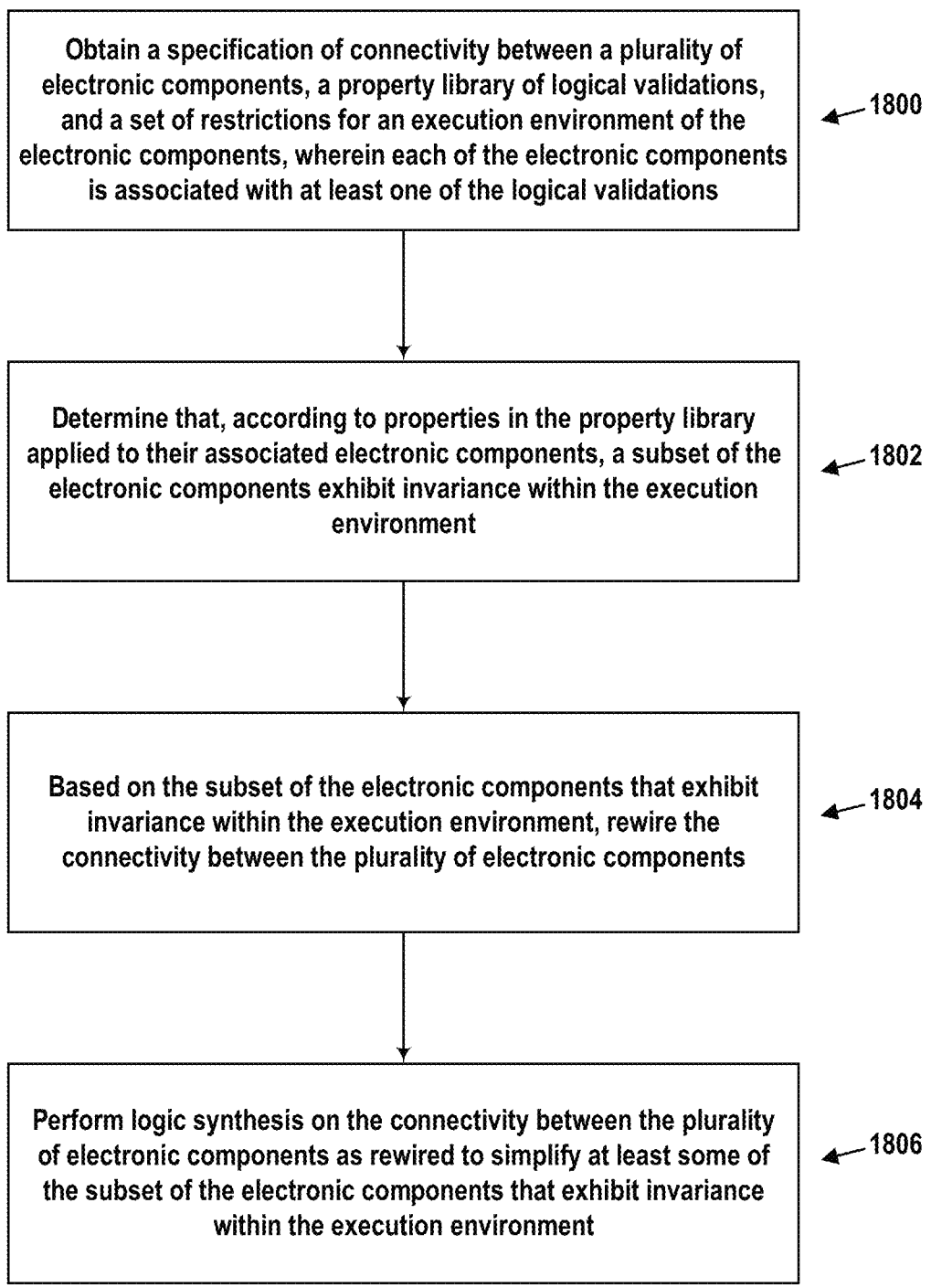
FIG. 18 is a flow chart, in accordance with example embodiments.

FIG. 18 is a flow chart illustrating an example embodiment. The process illustrated by FIG. 18 may be carried out by a desktop computing device or system. However, the process can be carried out by other types of devices or device subsystems. For example, the process could be carried out by a portable computer, such as a laptop or a tablet device, or one or more server devices.

The embodiments of FIG. 18 may be simplified by the removal of any one or more of the features shown therein. Further, these embodiments may be combined with features, aspects, and/or implementations of any of the previous figures or otherwise described herein.

Block 1800 may involve obtaining a specification of connectivity between a plurality of electronic components, a property library of logical validations, and a set of restrictions for an execution environment of the electronic components, wherein each of the electronic components is associated with at least one of the logical validations.

Block 1802 may involve determining that, according to properties in the property library applied to their associated electronic components, a subset of the electronic components exhibit invariance within the execution environment.

Block 1804 may involve, possibly based on the subset of the electronic components that exhibit invariance within the execution environment, rewiring the connectivity between the plurality of electronic components.

Block 1806 may involve performing logic synthesis on the connectivity between the plurality of electronic components as rewired to simplify at least some of the subset of the electronic components that exhibit invariance within the execution environment.

In some embodiments, the properties in the property library include logic statements specifying invariance within inputs of an electronic component, outputs of the electronic component, or both the inputs and the outputs of the electronic component.

In some embodiments, the execution environment includes a workload executable by the plurality of electronic components.

In some embodiments, simplifying at least some of the subset of the electronic components that exhibit invariance within the execution environment comprises reducing a transistor count of the subset of the electronic components that exhibit invariance within the execution environment.

In some embodiments, simplifying at least some of the subset of the electronic components that exhibit invariance within the execution environment comprises removing at least some of the subset of the electronic components that exhibit invariance within the execution environment.

In some embodiments, performing logic synthesis on the connectivity between the plurality of electronic components as rewired results in a simplified plurality of electronic components that is functionality equivalent to the plurality of electronic components when used within the execution environment.

In some embodiments, each of the electronic components is a logic gate of a synchronous digital circuit. In some embodiments, the synchronous digital circuit has an obfuscated design.

In some embodiments, determining that the subset of the electronic components exhibit invariance within the execution environment comprises determining that logic gates of the subset of the electronic components have constant output values within the execution environment.

In some embodiments, performing logic synthesis on the connectivity between the plurality of electronic components as rewired to simplify at least some of the subset of the electronic components that exhibit invariance within the execution environment comprises removing at least some of the logic gates of the subset of the electronic components that have constant output values within the execution environment.

In some embodiments, performing logic synthesis on the connectivity between the plurality of electronic components as rewired to simplify at least some of the subset of the electronic components that exhibit invariance within the execution environment comprises replacing at least some of the logic gates of the subset of the electronic components that have constant output values within the execution environment with simpler gates.

In some embodiments, determining that the subset of the electronic components exhibit invariance within the execution environment comprises: transforming the plurality of electronic components into a transition system representation; transforming the properties in the property library and the execution environment into automata; and applying the automata to the transition system representation.

In some embodiments, the plurality of electronic components defines a microprocessor with an instruction set, wherein the properties encode instructions of the instruction set, wherein the execution environment defines a reduced version of the instruction set, and wherein the plurality of electronic components as rewired supports the reduced version of the instruction set.

In some embodiments, the execution environment also defines constraints on memory input ports within the plurality of electronic components.

In some embodiments, the execution environment also defines cutpoints within the plurality of electronic components that align the instructions of the instruction set Some embodiments may further involve fabricating a chip containing the plurality of electronic components as rewired.

X. EXAMPLE COMPUTING DEVICE AND SYSTEM EMBODIMENTS

Figure 19:
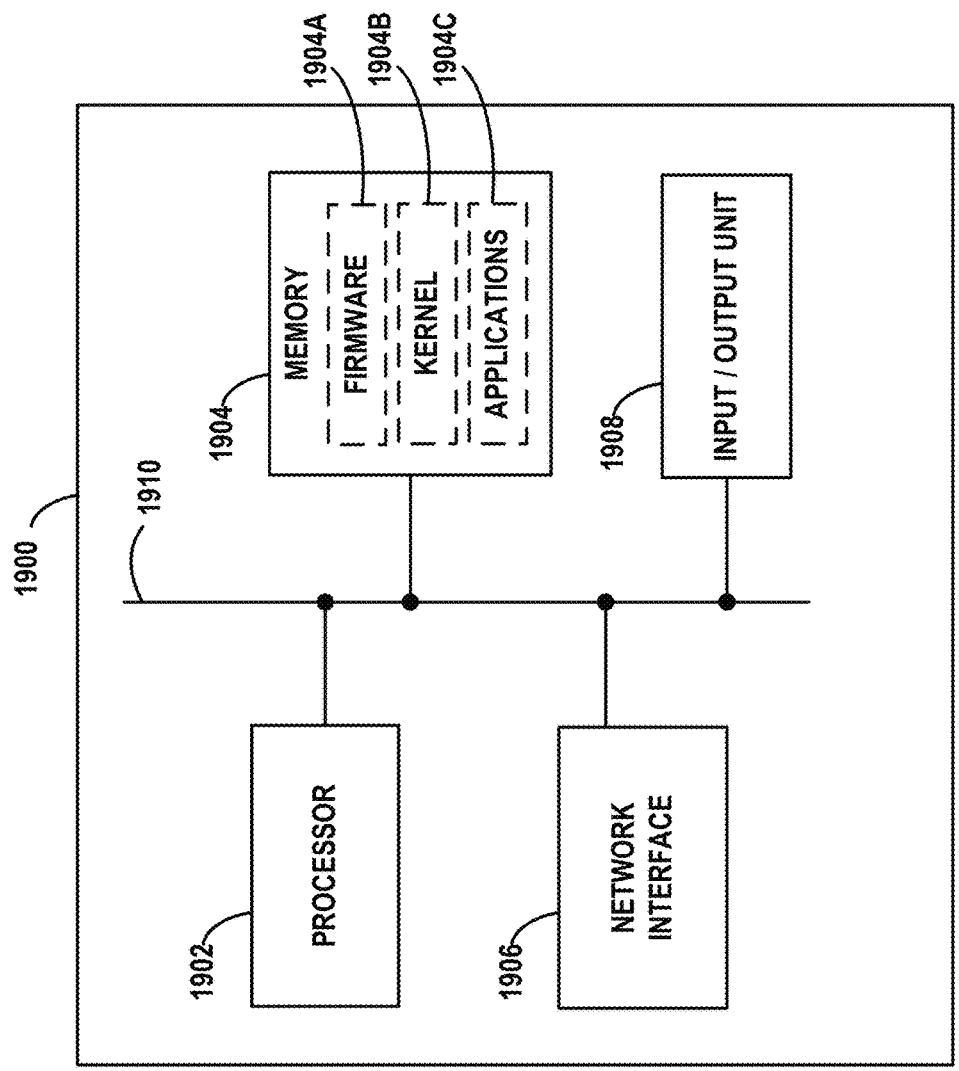
FIG. 19 illustrates a schematic drawing of a computing device, in accordance with example embodiments.

FIG. 19 is a simplified block diagram exemplifying a computing device 1900, illustrating some of the components that could be included in a computing device arranged to operate in accordance with the embodiments herein, such as carrying out some or all of the above processing steps, algorithms and techniques. Computing device 1900 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 1900 includes processor 1902, memory 1904, network interface 1906, and input/output unit 1908, all of which may be coupled by system bus 1910 or a similar mechanism. In some embodiments, computing device 1900 may include other components and/or peripheral devices (e.g., detachable storage, printers, and so on).

Processor 1902 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 1902 may be one or more single-core processors. In other cases, processor 1902 may be one or more multi-core processors with multiple independent processing units. Processor 1902 may also include register memory for temporarily storing instructions being executed and related data, as well as cache memory for temporarily storing recently-used instructions and data.

Memory 1904 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 1904 represents both main memory units, as well as long-term storage. Other types of memory may include biological memory.

Memory 1904 may store program instructions and/or data on which program instructions may operate. By way of example, memory 1904 may store these program instructions on a non-transitory, computer-readable medium, such that the instructions are executable by processor 1902 to carry out any of the methods, processes, or operations disclosed in this specification or the accompanying drawings.

As shown in FIG. 19, memory 1904 may include firmware 1904A, kernel 1904B, and/or applications 1904C. Firmware 1904A may be program code used to boot or otherwise initiate some or all of computing device 1900. Kernel 1904B may be an operating system, including modules for memory management, scheduling, and management of processes, input/output, and communication. Kernel 1904B may also include device drivers that allow the operating system to communicate with the hardware modules (e.g., memory units, networking interfaces, ports, and buses) of computing device 1900. Applications 1904C may be one or more user-space software programs, such as web browsers or email clients, as well as any software libraries used by these programs. Memory 1904 may also store data used by these and other programs and applications.

Network interface 1906 may take the form of one or more wireline interfaces, such as Ethernet (e.g., Fast Ethernet, Gigabit Ethernet, and so on). Network interface 1906 may also support communication over one or more non-Ethernet media, such as coaxial cables or power lines, or over wide-area media, such as Synchronous Optical Networking (SONET) or digital subscriber line (DSL) technologies. Network interface 1906 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 1906. Furthermore, network interface 1906 may comprise multiple physical interfaces. For instance, some embodiments of computing device 1900 may include Ethernet, BLUETOOTH®, and Wifi interfaces.

Input/output unit 1908 may facilitate user and peripheral device interaction with computing device 1900. Input/output unit 1908 may include one or more types of input devices, such as a keyboard, a mouse, a touch screen, and so on. Similarly, input/output unit 1908 may include one or more types of output devices, such as a screen, monitor, printer, and/or one or more light emitting diodes (LEDs). Additionally or alternatively, computing device 1900 may communicate with other devices using a universal serial bus (USB) or high-definition multimedia interface (HDMI) port interface, for example.

In some embodiments, one or more computing devices like computing device 1900 may be deployed to support a larger architecture. The exact physical location, connectivity, and configuration of these computing devices may be unknown and/or unimportant to client devices. Accordingly, the computing devices may be referred to as "cloud-based" devices that may be housed at various remote data center locations.

Figure 20:
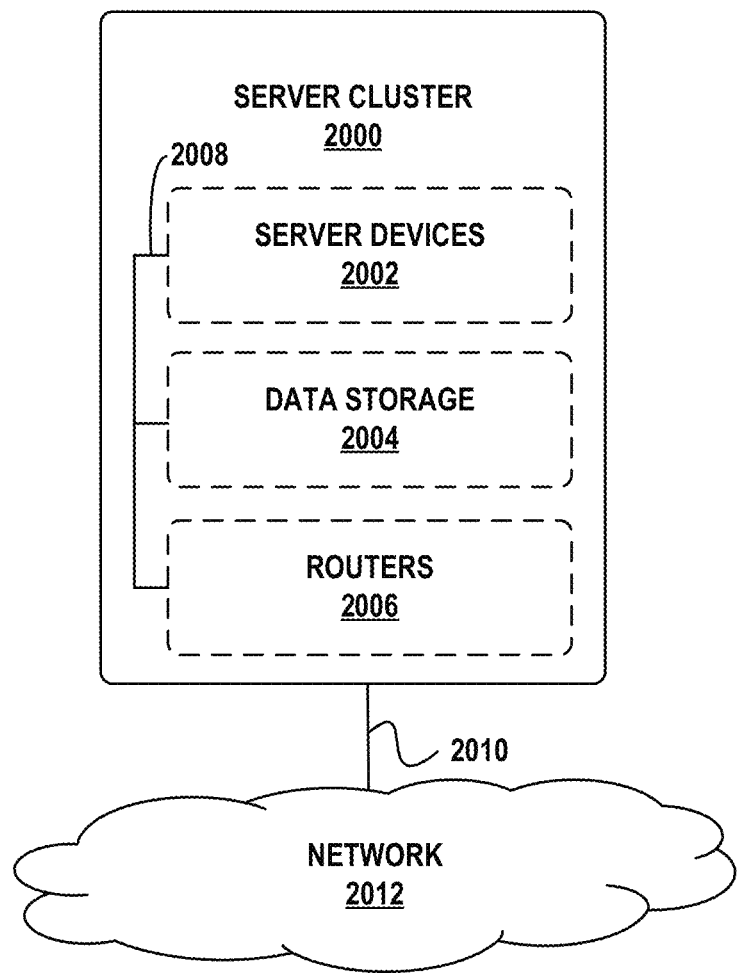
FIG. 20 illustrates a schematic drawing of a server device cluster, in accordance with example embodiments.

FIG. 20 depicts a cloud-based server cluster 2000 in accordance with example embodiments. In FIG. 20, operations of a computing device (e.g., computing device 1900) may be distributed between server devices 2002, data storage 2004, and routers 2006, all of which may be connected by local cluster network 2008. The number of server devices 2002, data storages 2004, and routers 2006 in server cluster 2000 may depend on the computing task(s) and/or applications assigned to server cluster 2000.

For example, server devices 2002 can be configured to perform various computing tasks of computing device 1900. Thus, computing tasks can be distributed among one or more of server devices 2002. To the extent that these computing tasks can be performed in parallel, such a distribution of tasks may reduce the total time to complete these tasks and return a result. For purposes of simplicity, both server cluster 2000 and individual server devices 2002 may be referred to as a "server device." This nomenclature should be understood to imply that one or more distinct server devices, data storage devices, and cluster routers may be involved in server device operations.

Data storage 2004 may be data storage arrays that include drive array controllers configured to manage read and write access to groups of hard disk drives and/or solid state drives. The drive array controllers, alone or in conjunction with server devices 2002, may also be configured to manage backup or redundant copies of the data stored in data storage 2004 to protect against drive failures or other types of failures that prevent one or more of server devices 2002 from accessing units of data storage 2004. Other types of memory aside from drives may be used.

Routers 2006 may include networking equipment configured to provide internal and external communications for server cluster 2000. For example, routers 2006 may include one or more packet-switching and/or routing devices (including switches and/or gateways) configured to provide (i) network communications between server devices 2002 and data storage 2004 via local cluster network 2008, and/or (ii) network communications between server cluster 2000 and other devices via communication link 2010 to network 2012.

Additionally, the configuration of routers 2006 can be based at least in part on the data communication requirements of server devices 2002 and data storage 2004, the latency and throughput of the local cluster network 2008, the latency, throughput, and cost of communication link 2010, and/or other factors that may contribute to the cost, speed, fault-tolerance, resiliency, efficiency, and/or other design goals of the system architecture.

As a possible example, data storage 2004 may include any form of database, such as a structured query language (SQL) database. Various types of data structures may store the information in such a database, including but not limited to tables, arrays, lists, trees, and tuples. Furthermore, any databases in data storage 2004 may be monolithic or distributed across multiple physical devices.

Server devices 2002 may be configured to transmit data to and receive data from data storage 2004. This transmission and retrieval may take the form of SQL queries or other types of database queries, and the output of such queries, respectively. Additional text, images, video, and/or audio may be included as well. Furthermore, server devices 2002 may organize the received data into web page or web application representations. Such a representation may take the form of a markup language, such as HTML, the eXtensible Markup Language (XML), or some other standardized or proprietary format. Moreover, server devices 2002 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

XI. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
   obtaining a specification of connectivity between a plurality of electronic components, a property library of logical validations, and a set of restrictions for an execution environment of the electronic components, wherein each of the electronic components is associated with at least one of the logical validations;
   determining that, according to properties in the property library applied to their associated electronic components, a subset of the electronic components exhibit invariance within the execution environment;
   based on the subset of the electronic components that exhibit invariance within the execution environment, rewiring the connectivity between the plurality of electronic components; and
   performing logic synthesis on the connectivity between the plurality of electronic components as rewired to simplify at least some of the subset of the electronic components that exhibit invariance within the execution environment.

2. The computer-implemented method of claim 1, wherein the properties in the property library include logic statements specifying invariance within inputs of an electronic component, outputs of the electronic component, or both the inputs and the outputs of the electronic component.

3. The computer-implemented method of claim 1, wherein the execution environment includes a workload executable by the plurality of electronic components.

4. The computer-implemented method of claim 1, wherein simplifying at least some of the subset of the electronic components that exhibit invariance within the execution environment comprises:
   reducing a transistor count of the subset of the electronic components that exhibit invariance within the execution environment.

5. The computer-implemented method of claim 1, wherein simplifying at least some of the subset of the electronic components that exhibit invariance within the execution environment comprises:
   removing at least some of the subset of the electronic components that exhibit invariance within the execution environment.

6. The computer-implemented method of claim 1, wherein performing logic synthesis on the connectivity between the plurality of electronic components as rewired results in a simplified plurality of electronic components that is functionality equivalent to the plurality of electronic components when used within the execution environment.

7. The computer-implemented method of claim 1, wherein each of the electronic components is a logic gate of a synchronous digital circuit.

8. The computer-implemented method of claim 7, wherein the synchronous digital circuit has an obfuscated design.

9. The computer-implemented method of claim 1, wherein determining that the subset of the electronic components exhibit invariance within the execution environment comprises:
   determining that logic gates of the subset of the electronic components have constant output values within the execution environment.

10. The computer-implemented method of claim 9, wherein performing logic synthesis on the connectivity between the plurality of electronic components as rewired to simplify at least some of the subset of the electronic components that exhibit invariance within the execution environment comprises:
    removing at least some of the logic gates of the subset of the electronic components that have constant output values within the execution environment.

11. Computer-implemented method of claim 9, wherein performing logic synthesis on the connectivity between the plurality of electronic components as rewired to simplify at least some of the subset of the electronic components that exhibit invariance within the execution environment comprises:
    replacing at least some of the logic gates of the subset of the electronic components that have constant output values within the execution environment with simpler gates.

12. The computer-implemented method of claim 1, wherein determining that the subset of the electronic components exhibit invariance within the execution environment comprises:
    transforming the plurality of electronic components into a transition system representation;
    transforming the properties in the property library and the execution environment into automata; and
    applying the automata to the transition system representation.

13. The computer-implemented method of claim 1, wherein the plurality of electronic components defines a microprocessor with an instruction set, wherein the properties encode instructions of the instruction set, wherein the execution environment defines a reduced version of the instruction set, and wherein the plurality of electronic components as rewired supports the reduced version of the instruction set.

14. The computer-implemented method of claim 13, wherein the execution environment also defines constraints on memory input ports within the plurality of electronic components.

15. The computer-implemented method of claim 13, wherein the execution environment also defines cutpoints within the plurality of electronic components that align the instructions of the instruction set.

16. An article of manufacture including a non-transitory computer-readable medium, having stored thereon program instructions that, when executed by a computing system, cause the computing system to perform operations comprising:
   obtaining a specification of connectivity between a plurality of electronic components, a property library of logical validations, and a set of restrictions for an execution environment of the electronic components, wherein each of the electronic components is associated with at least one of the logical validations;
   determining that, according to properties in the property library applied to their associated electronic components, a subset of the electronic components exhibit invariance within the execution environment;
   based on the subset of the electronic components that exhibit invariance within the execution environment, rewiring the connectivity between the plurality of electronic components; and
   performing logic synthesis on the connectivity between the plurality of electronic components as rewired to simplify at least some of the subset of the electronic components that exhibit invariance within the execution environment.

17. The article of manufacture of claim 16, wherein performing logic synthesis on the connectivity between the plurality of electronic components as rewired to simplify at least some of the subset of the electronic components that exhibit invariance within the execution environment comprises:
    removing at least some logic gates of the subset of the electronic components that have constant output values within the execution environment.

18. The article of manufacture of claim 16, wherein performing logic synthesis on the connectivity between the plurality of electronic components as rewired to simplify at least some of the subset of the electronic components that exhibit invariance within the execution environment comprises:
    replacing at least some logic gates of the subset of the electronic components that have constant output values within the execution environment with simpler gates.

19. The article of manufacture of claim 16, wherein the plurality of electronic components defines a microprocessor with an instruction set, wherein the properties encode instructions of the instruction set, wherein the execution environment defines a reduced version of the instruction set, and wherein the plurality of electronic components as rewired supports the reduced version of the instruction set.

20. A method comprising:
    obtaining a specification of connectivity between a plurality of electronic components, a property library of logical validations, and a set of restrictions for an execution environment of the electronic components, wherein each of the electronic components is associated with at least one of the logical validations;
    determining that, according to properties in the property library applied to their associated electronic components, a subset of the electronic components exhibit invariance within the execution environment;
    based on the subset of the electronic components that exhibit invariance within the execution environment, rewiring the connectivity between the plurality of electronic components;
    performing logic synthesis on the connectivity between the plurality of electronic components as rewired to simplify at least some of the subset of the electronic components that exhibit invariance within the execution environment; and fabricating a chip containing the plurality of electronic components as rewired.

* * * * *